United States Patent
Boemer et al.

(10) Patent No.: US 12,443,409 B2
(45) Date of Patent: Oct. 14, 2025

(54) CONDITIONAL MODULAR SUBTRACTION INSTRUCTION

(71) Applicant: Intel Corporation, Santa Clara, CA (US)

(72) Inventors: Fabian Boemer, Santa Barbara, CA (US); Vinodh Gopal, Westborough, MA (US); Gelila Seifu, San Jose, CA (US); Sejun Kim, Hillsboro, OR (US); Jack Crawford, London (GB)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 17/476,726

(22) Filed: Sep. 16, 2021

(65) Prior Publication Data

US 2023/0081763 A1 Mar. 16, 2023

(51) Int. Cl.
*G06F 9/30* (2018.01)
*G06F 7/49* (2006.01)
(Continued)

(52) U.S. Cl.
CPC ........... *G06F 9/30145* (2013.01); *G06F 7/49* (2013.01); *G06F 7/722* (2013.01); *G06F 9/3001* (2013.01); *G06F 9/30036* (2013.01); *G06F 9/30038* (2023.08); *H04L 9/008* (2013.01); *H04L 9/30* (2013.01)

(58) Field of Classification Search
CPC ........ G06F 9/30145; G06F 7/49; G06F 7/722; G06F 9/3001; G06F 9/30036; G06F 9/30038; G06F 9/30021; H04L 9/008; H04L 9/30
See application file for complete search history.

(56) References Cited

U.S. PATENT DOCUMENTS 6,036,350 A * 3/2000 Mennemeier ........... G06F 7/544
                                                      708/671
6,185,670 B1 * 2/2001 Huff ...................... G06F 9/30145
                                                      712/E9.034

(Continued)

FOREIGN PATENT DOCUMENTS

DE     102022124466 A1    5/2023
EP         4152147 A1    3/2023

OTHER PUBLICATIONS

CN Publication Notificaiton for CN202210981945.0, 4 pages, Mar. 24, 2023.

(Continued)

*Primary Examiner* — Farley Abad
(74) *Attorney, Agent, or Firm* — Nicholson De Vos Webster & Elliott LLP

(57) ABSTRACT

One embodiment provides a processor comprising first circuitry to decode an instruction into a decoded instruction, the instruction to indicate a first source operand and a second source operand and second circuitry including a processing resource to execute the decoded instruction, wherein responsive to the decoded instruction, the processing resource is to output a result of first source operand data minus second source operand data in response to a determination by the processing resource that the first source operand data is greater than or equal to the second source operand data, otherwise the processing resource is to output the first source operand data.

15 Claims, 22 Drawing Sheets

(51) Int. Cl.
*G06F 7/72* (2006.01)
*H04L 9/00* (2022.01)
*H04L 9/30* (2006.01)

(56) References Cited

U.S. PATENT DOCUMENTS

| | | | | |
|---|---|---|---|---|
| 6,470,440 | B1* | 10/2002 | Nguyen | G06F 9/30021 |
| | | | | 712/7 |
| 6,564,314 | B1 | 5/2003 | May et al. | |
| 7,196,708 | B2 | 3/2007 | Dorojevets et al. | |
| 8,205,097 | B2 | 6/2012 | Malzahn et al. | |
| 8,995,651 | B1 | 3/2015 | Lee et al. | |
| 2003/0061539 | A1* | 3/2003 | Murray | G06F 7/026 |
| | | | | 712/E9.02 |
| 2005/0027969 | A1* | 2/2005 | Simon | G06F 7/5443 |
| | | | | 712/225 |
| 2005/0219422 | A1 | 10/2005 | Dorojevets et al. | |
| 2011/0153993 | A1 | 6/2011 | Gopal et al. | |
| 2011/0276790 | A1* | 11/2011 | Olson | G06F 9/30076 |
| | | | | 712/222 |
| 2015/0006857 | A1* | 1/2015 | Kuo | G06F 9/30038 |
| | | | | 712/208 |
| 2018/0046900 | A1* | 2/2018 | Dally | G06F 9/30018 |
| 2018/0189064 | A1 | 7/2018 | Plotnikov et al. | |
| 2019/0079762 | A1* | 3/2019 | Heinecke | G06F 9/30025 |
| 2019/0196826 | A1 | 6/2019 | Madduri et al. | |
| 2020/0210199 | A1* | 7/2020 | Ould-Ahmed-Vall | |
| | | | | G06F 9/30018 |
| 2023/0140257 | A1 | 5/2023 | Boemer et al. | |

OTHER PUBLICATIONS

Intention to Grant, EP App. No. 22188194.9, Jun. 25, 2024, 6 pages.
Extended European Search Report for EP22188194.9, 7 pages, Feb. 6, 2023.
European Search Report and Search Opinion, EP App. No. 22188194.9, Feb. 6, 2023, 7 pages.
Publication of CN Application No. 202211158890.X, mailed May 15, 2023, 4 pages.
Amos R. Omondi, Cryptography Arithmetic, 2020, Springer, pp. 143-154. (Year: 2020).
Decision to Grant, EP App. No. 22188194.9, Oct. 10, 2024, 2 pages.
Intel, Intel 64 and IA-32 Architecture Software Developer's Manual, 2015, pp. 3-1 to 3-30. (Year: 2025).
John Hennessy, Computer Architecture, 2012, Elsevier, pp. 236-241. (Year: 2012).
Non-Final Office Action, U.S. Appl. No. 17/514,523, Mar. 28, 2025, 17 pages.

* cited by examiner

| PREFIX(ES) 1301 | OPCODE 1303 | ADDRESSING 1305 | DISPLACEMENT 1307 | IMMEDIATE 1309 |

CONDITIONAL MODULAR SUBTRACTION INSTRUCTION

BACKGROUND

Privacy-preserving machine learning (PPML) is a key upcoming trend which enables learning from data while keeping it private. PPML techniques include the use of secure execution techniques, federated learning, secure multi-party computation, and homomorphic encryption (HE). HE is a form of encryption which enables computation on the encrypted data. However, HE encryption schemes are computationally expensive. Accordingly, techniques to reduce the computational expense of HE algorithms are beneficial to PPML and other privacy preserving analysis techniques that enable computations to be performed on private data without exposing the underlying data to the computation device.

BRIEF DESCRIPTION OF THE DRAWINGS

The present invention is illustrated by way of example and not limitation in the figures of the accompanying drawings in which like references indicate similar elements, and in which.

DETAILED DESCRIPTION

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. The techniques and teachings described herein may be applied to a device, system, or apparatus including various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Polynomial multiplication in the finite field $$\frac{Z_q}{X^N + 1}$$

(polynomials degree at most N−1 whose coefficients are integers mod q), or similar fields, is a key bottleneck in the cryptography workloads of many HE applications. The negacyclic number-theoretic transform (NTT), both the forward transform and the inverse transform, is a modification of the cyclic NTT that can be used to improve the acceleration of polynomial multiplication. Multiplying two polynomials f(x)*g(x) in this field is typically computed as InvNTT(FwdNTT(f)⊙FwdNTT(g)), where ⊙ indicates element-wise vector-vector modular multiplication. In particular, the NTT is used to speed up polynomial multiplication over a polynomial ring. The core of the NTT computation is modular integer arithmetic, in particular modular addition and multiplication. Notwithstanding numerous optimizations to NTT computation, NTT operations remain a critical performance bottleneck for HE applications.

Described herein is a new set of instructions to optimize the forward and inverse NTT and element-wise modular multiplication. These instructions (vpcondsubuq) perform conditional subtraction and have the potential to provide a significant improvement in the performance of the forward and reverse NTT operation. The vpcondsubuq instruction also has the potential to speed up polynomial addition, which is also common in HE workloads.

Figure 1:
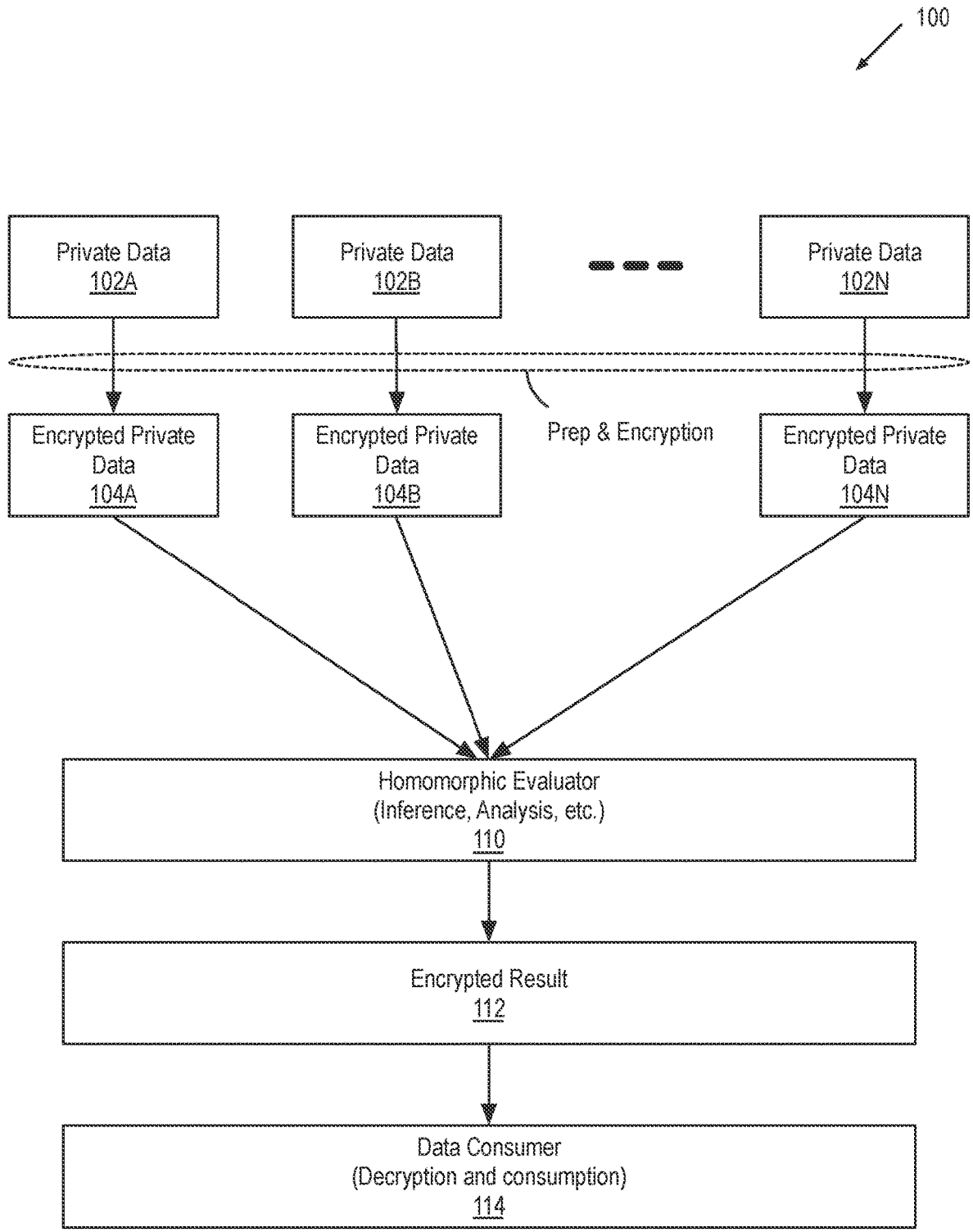
FIG. 1 illustrates a system that can be used to perform PPML via HE.

FIG. 1 illustrates a system 100 that can be used to perform PPML via HE. The system 100 includes a homomorphic evaluator 110 that includes a processing system that provides hardware acceleration for HE. The system 100 enables private data 102A-102N to be processed without exposing the underlying data to the homomorphic evaluator 110. The private data 102A-102N represents any data that is protected from wide dissemination, such as personal, personally identifiable, financial, sensitive, or regulated information. The private data 102A-102N can be multiple elements of private data associated with a single client device or can represent different instances of the same element of private data that is provided by multiple client devices.

Client device(s) associated with the private data 102A-102N can prepare (e.g., format) the data and then encrypt the data into encrypted private data 104A-104N. The encrypted private data 104A-104N can then be provided to the homomorphic evaluator 110 for processing in a privacy preserving manner. The homomorphic evaluator 110 uses HE algorithms to perform inference, analysis, and other mathematical operations on encrypted data. HE operations performed by the homomorphic evaluator 110 produce an encrypted result 112 that is consistent with the result that would be produced if equivalent mathematical operations had been performed on unencrypted data. The encrypted result 112 can then be provided to a data consumer 114 for decryption and consumption. To enable encryption of the private data 102A-102N and the decryption of the encrypted result 112, the data consumer 114 can generate a public and private homomorphic key pair. The public key enables the encryption of the private data (e.g., by the one or more clients that possess the private data 102A-102N). The private key enables the data consumer 114 to decrypt an analysis result that is generated by the homomorphic evaluator 110 based on the encrypted data.

The performance and efficiency of the HE operations that are performed by the homomorphic evaluator 110 can be improved via the use of processing resources (e.g., central processing units (CPU), graphics processing units (GPUs), compute accelerators, Field Programmable Gate Arrays (FPGAs), etc.) that provide support for an instruction set architecture (ISA) that includes instructions to accelerate the performance and/or efficiency of routinely performed HE operations. For example, the performance and efficiency of HE operations can be improved by providing instructions that enable common operations to be performed using a reduced number of instructions. Embodiments described herein provide processing resources that include support for instructions to accelerate HE operations.

Figure 2:
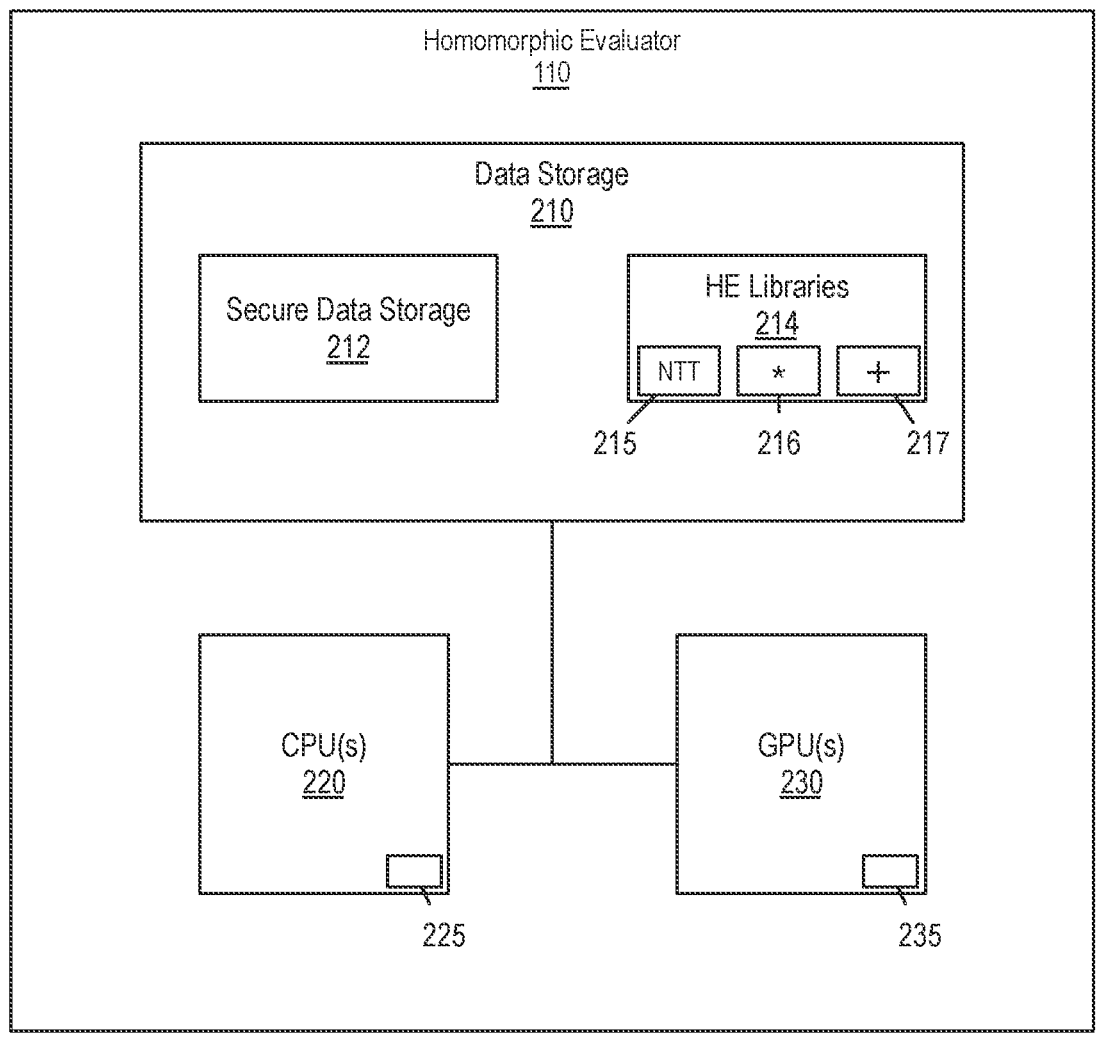
FIG. 2 illustrates a homomorphic evaluator configured to perform hardware accelerated homomorphic encryption operations.

FIG. 2 illustrates a homomorphic evaluator 110 configured to perform hardware accelerated homomorphic encryption operations. In one embodiment the homomorphic evaluator 110 includes data storage 210, one or more CPU(s) 220, and one or more GPU(s) 230. The data storage 210 can include system memory that is used to facilitate program execution, which may be volatile or non-volatile memory, as well as non-volatile storage memory to facilitate persistent data storage. The various memory types and devices can have different physical address spaces while sharing a virtual memory address space. The data storage 210 can also encompass memory that is local to one or more of the GPU(s) 230, which can also be included in a unified virtual address space that is shared between the CPU(s) 220 and the GPU(s) 230.

The data storage 210 can include a region of secure data storage 212, which is used to store encrypted private data 104A-104N. Although the encrypted private data 104A-104N is encrypted, the secure data storage 212 can be further encrypted using additional encryption keys, such as, for example keys that are specific to the homomorphic evaluator 110, the service provider associated with the homomorphic evaluator 110, and/or keys that are specific to the client that are managed by the encrypted private data 104A-104N. Data storage 210 can also include homomorphic encryption libraries (HE libraries 214). Exemplary HE libraries 214 include but are not limited to the SEAL, PALISADE, and libraries. The SEAL and PALISADE homomorphic encryption libraries enable the performance of homomorphic encryption operations on encrypted data. The HEXL (homomorphic encryption acceleration) library accelerates the performance of the SEAL and PALISADE libraries by providing efficient implementations of integer arithmetic on Galois fields, which are prevalent and frequently performed operations in encryption generally and homomorphic encryption in particular.

While specific exemplary libraries are described, embodiments described herein provide instructions that may be used by, and are not specific to, any particular software that is executable by the processing resources described herein. For example, HE libraries 214, and any other program code, can use instructions provided herein to accelerate number-theoretic transform operations (NTT operations 215), element-wise modular multiplication operations 216, and polynomial addition operations 217. Acceleration is performed via hardware logic 225 within the CPU(s) 220 and/or hardware logic 235 within the GPU(s), where the hardware logic 225 of the CPU(s) 220 and the hardware logic 235 of the GPU(s) 230 are implemented in the respective processors via circuitry that includes configurable hardware logic and/or fixed-functionality hardware logic.

The NTT associated with NTT operations 215 is equivalent to the fast Fourier transform (FFT) in a finite (Galois) field, such that all addition and multiplications are performed with respect to the modulus q. As noted above, multiplying two polynomials $f(x)*g(x)$ in this field is typically computed as $InvNTT(FwdNTT(f) \odot FwdNTT(g))$, where $\odot$ indicates element-wise vector-vector modular multiplication. The NTT-based formulation reduces the runtime of polynomial-polynomial modular multiplication from $O(N^2)$ to $O(N \log N)$.

The forward NTT can be implemented using the Cooley-Tukey radix-2 transform shown in Table 1, where $a=(a_0, a_1, \ldots, a_{N-1}) \in \mathbb{Z}_q^N$ in standard ordering, N is a power of 2, q is a prime satisfying $q \equiv 1 \mod 2N$, and $\psi_{rev} \in \mathbb{Z}_q^N$ stores the powers of $\psi$ in bit-reversed order.

TABLE 1

| Cooley-Tukey Radix-2 NTT |
|---|
| 1: function Cooley-Tukey Radix-2 NTT(a, N, q, $\psi_{rev}$) |
| 2:    t ← n |
| 3:    for (m = 1; m < n; m = 2n) do |
| 4:       t ← t/2 |
| 5:       for (i = 0; i < m; i++) do |
| 6:          $j_1 \leftarrow 2 \cdot i \cdot t$ |
| 7:          $j_2 \leftarrow j_1 + t - 1$ |
| 8:          $W \leftarrow \psi_{rev}[m + i]$ |
| 9:          for (j = $j_1$; j ≤ $j_2$; j++) do |

TABLE 1-continued

Cooley-Tukey Radix-2 NTT

```
10:            X₀ < aⱼ
11:            X₁ < aⱼ₊ₜ
12:            aⱼ ← X₀ + W • X₁ mod q
13:            aⱼ₊ₜ ← X₀   W • X₁ mod q
14:         end for
15:      end for
16:   end for
17:   return a
18: end function
```

The "butterfly" operation in lines 9-14 of the Cooley-Tukey Radix-2 NTT is the bulk of the computation and include modular addition and modular multiplication. Optimizations to the butterfly operation are also possible, for example using the Harvey NTT butterfly, which delays modular reduction for improved performance. For the Harvey NTT shown in Table 2, $\beta=2^{64}$ is the typical word size for 64-bit processors.

TABLE 2

Harvey NTT Butterfly

```
1: function HARVEYNTTBUTTERFLY(X₀, X₁, W, W', q, β)
2:    if X₀ ≥ 2q then
3:       X₀ ← X₀ - 2q
4:    end if
5:    Q ← ⌊W'X₁/β⌋
6:    T ← (WX₁ - Qq) mod β
7:    Y₀ ← X₀ + T
8:    Y1 ← X0 - T + 2q
9:    return Y₀, Y₁
10: end function
```

Using the Harvey butterfly in the Cooley-Tukey NTT yields outputs in $\mathbb{Z}_{4q}^N$, so an additional correction step is performed to reduce the output to $\mathbb{Z}_q^N$. An exemplary inverse NTT operation in the form of the Gentleman-Sande inverse NTT algorithm is shown in Table 3.

TABLE 3

Gentleman-Sande Radix-2 Inverse NTT
( )

```
1: function GENTLEMAN-SANDE RADIX-2 INVNTT(a, N, q, ψᵣₑᵥ)
2:    t ← 1
3:    for (m = n; m > 1; m = m/2) do
4:       j₁ ← 0
5:       h ← m/2
6:       for (i = 0; i < h; i++) do
7:          j₂ < j₁ + t - 1
8:          W ← ψᵣₑᵥ⁻¹[h + i]
9:          for (j = j₁; j ≤ j₂; j++) do
10:            X₀ ← aⱼ
11:            X₁ ← aⱼ₊ₜ
12:            aⱼ ← X₀ + X₁ mod q
13:            aⱼ₊ₜ ← (X₀ - X₁) • W mod q
14:         end for
15:         j₁ ← j₁ + 2t
16:      end for
17:      t ← 2t
18:   end for
19:   for (j = 0; j < n; j++) do
20:      a[j] ← a[j] • n⁻¹ mod q
21:   end for
22:   return a
23: end function
```

Where the Harvey NTT Butterfly optimization is used, the Harvey inverse NTT Butterfly of Table 4 may be used for the inverse NTT.

TABLE 4

Harvey inverse NTT Butterfly
( )

```
1: function HARVEYINVNTTBUTTERFLY(X₀, X₁, W, W', q, β)
2:    Y₀ ← X₀ + X₁
3:    if Y₀ ≥ 2q then
4:       Y₀ ← Y₀ - 2q
5:    end if
6:    T ← X₀ - X₁ + 2q
7:    Q ← ⌊W'T/β⌋
8:    Y₁ ← (WT - Qq) mod β
9:    return Y₀, Y₁
10: end function
```

Element-wise modular multiplication in HE workloads can use Barrett reduction to speed up the modular reduction step. Barrett reduction uses a Barrett factor, which is a pre-computed integer k, to simplify the reduction to a series of bit-shifts, multiplications, and subtractions. Barrett reduction can be performed as shown in Table 5.

TABLE 5

Barrett Reduction

```
1: function BARRETT REDUCTION(d, q, k, Q, L)
2:    c₁ ← d >> (Q - 1)
3:    c₂ ← c₁ k
4:    c₃ ← c₂ >> (L - Q + 1)
5:    c₄ < d - qc₃
6:    if c₄ ≥ q then
7:       c₄ ← c₄ - q
8:    end if
9:    return c₄
10: end function
```

As the operations described above are used in HE algorithms, improving the performance of the above operations can improve the performance of HE implementations that include the above operations.

Figure 3:
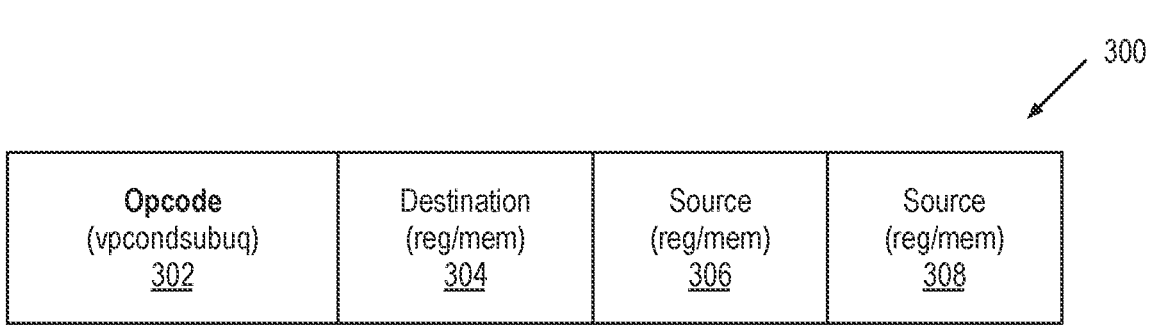
FIG. 3 illustrates a conditional subtraction instruction, according to an embodiment.

FIG. 3 illustrates a conditional subtraction instruction 300, according to an embodiment. The conditional subtraction instruction 300 can be used to improve the performance of HE implementations that include the above operations. The conditional subtraction instruction 300, in one embodiment, is in a format that includes an opcode that identifies the instruction, as well as a destination operand 304, a first source operand 306, and a second source operand 308. In one embodiment, the instruction is specified as an in-place operation in which the destination operand 304 is determined based on the first source operand 306.

A set of conditional subtraction instructions are shown in Table 6 below.

TABLE 6

Conditional Subtraction Instructions

| | |
|---|---|
| 1: | vpcondsubuq xmm1, xmm2/m128 (src1, src2/dst) (2 sources, 1 destination) |
| 2: | vpcondsubuq ymm1, ymm2/m256 (src1, src2/dst) (2 sources, 1 destination) |
| 3: | vpcondsubuq zmm1, zmm2/m512 (src1, src2/dst) (2 sources, 1 destination) |

The conditional instructions of Table 6, when executed, cause a processing resource (e.g., CPU, GPU) to compare packed unsigned N-bit integers in src1 to packed unsigned N-bit integers in src2 and store the output of the comparison to an 8-bit intermediate mask. For each bit set in the intermediate mask, the processing resource then subtracts the corresponding N-bit integer in src2 from the corresponding N-bit integer in src1 and stores the result in the corresponding packed N-bit integer in the destination. For each bit not set in the intermediate mask, writes the corresponding N-bit integer from src1 to the destination. The processing resource can then return the destination. Operand data can be stored in 128-bit (xmm) registers, 256-bit (ymm) registers, or 512-bit (zmm) registers. Operands may also be read from or written to memory addresses storing 128-bit, 256-bit, or 512-bit packed data, with each element being an N-bit integer. The bit-widths that are most useful for HE applications are N=32, N=64, although embodiments are not limited to those specific values. While instructions using 128-bit, 256-bit, and 512-bit registers or packed memory locations are shown, embodiments are not limited to those specific widths.

The instructions of Table 6 can be performed using operations shown in Table 7.

TABLE 7

Conditional Subtraction Operation

1: FOR j := 0 to (NBitLanes − 1)
2:   i := j*N
3:   dst[i+N:i] = (src1[i+N:i] >= src2[i+N:i]) ? src1[i+N:i] − src2[i+N:i] : src1[i+N:i]
4: ENDFOR In the operations shown in Table 7, a conditional subtraction is performed for each N-bit integer element in which either (src1-src2) or src1 is assigned to the destination element based on whether the src1 element is greater than or equal to the respective src2 element.

Variant conditional subtraction instructions are shown in Table 8 below, in which the conditional subtraction instruction 300 using a single 64-bit integer for the second source operand 308 as in FIG. 3.

TABLE 8

Variant Conditional Subtraction Instructions

| 1: | vpcondsubuq xmm1, r64/m64 (src1, src2/dst) |
|    | (2 sources, 1 destination) |
| 2: | vpcondsubuq ymm1, r64/m64 (src1, src2/dst) |
|    | (2 sources, 1 destination) |
| 3: | vpcondsubuq zmm1, r64/m64 (src1, src2/dst) |
|    | (2 sources, 1 destination) |

The variant instructions of Table 8 are useful in cases such as the NTT and Barrett reduction, where the same modulus may be re-used many times. The variant instructions of Table 8 can be performed using operations shown in Table 9.

TABLE 9

Variant Conditional Subtraction Instructions

1: FOR j := 0 to (NBitLanes − 1)
2:   i := j*N
3:   dst[i+N:i] = (src1[i+N:i] >= src2[N:0]) ? src1[i+N:i] − src2[N:0] : src1[i+N:i]
4: ENDFOR In the operations shown in Table 9, a conditional subtraction is performed for each N-bit src1 integer element and a single 64-bit src2 integer element in which either (src1-src2) or src1 is assigned to the destination element based on whether a src1 element is greater than or equal to the specified src2 element. Conditional subtraction is common in HE kernels. In particular, for x, y<q, where q is a modulus, vpcondsubuq(x+y, q) will return (x+y) mod q. Modular addition is common in the NTT and in some instances can be performed using a reduced number of instructions when a conditional subtraction instruction is used. Conditional subtraction is also common in Barrett reduction, as shown by lines 6-7 in Table 5 above.

As discussed above, a vpcondsubuq instruction be embodied in several forms, including a 128-bit, 256-bit, and 512-bit form. Furthermore, the packed integers may be of different bit widths. For example, a vpcondsubuq instruction may operate on packed 64-bit integers or packed 32-bit integers. Additionally, one embodiment provides a vpcondsubq instruction that operates on signed integers, which may be useful in cases where elements of $Z_q=\{$integers mod q$\}$ are represented using the range $[-q/2, q/2)$. For comparison, the unsigned integer instantiation may be useful when $Z_q$ is represented using the range $[0,q)$.

Figure 4:
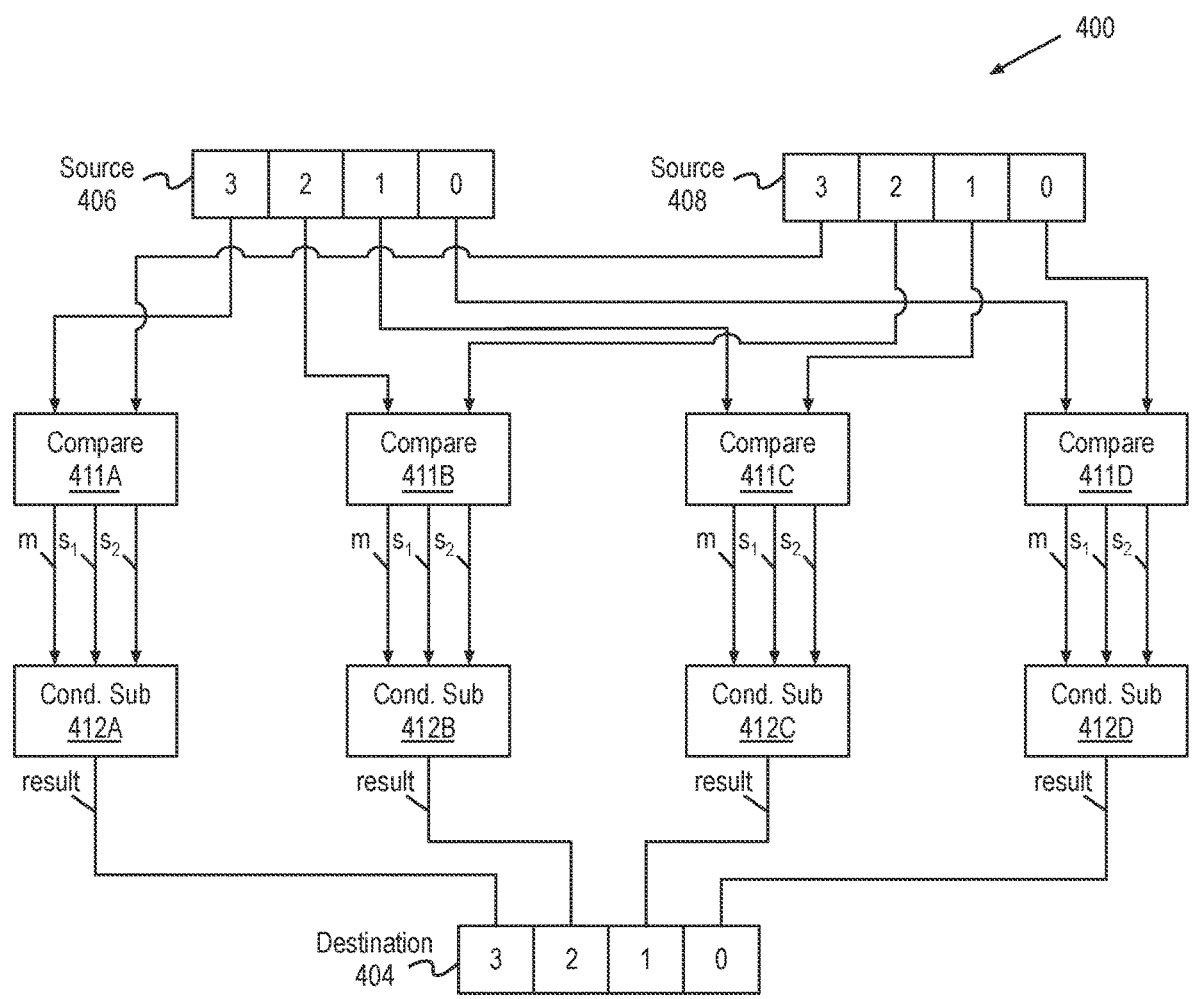
FIG. 4 illustrates circuitry to perform a conditional subtraction instruction, according to an embodiment.

FIG. 4 illustrates circuitry 400 to perform a conditional subtraction instruction, according to an embodiment. Circuitry 400, illustrated in block diagram, performs a conditional element-wise subtraction operation on a first source 406 and a second source 408, which are illustrated as, but are not limited to, four-element packed data inputs. An element-wise compare operation is performed using comparator circuits 411A-411D to determine whether an element of the first source 406 is greater than or equal to a corresponding element of the second source 408. The comparator circuits can pass through respective src1 ($S_1$) and src2 ($S_2$) inputs, as well as a mask bit (m) that indicates the result of the comparison operation. Conditional subtraction circuits 412A-412D can then each output either ($S_1-S_2$) or $S_1$ depending on the value of the mask bit. A destination 404 can then store the result that is output from each of the conditional subtraction circuits 412A-412D.

Figure 5:
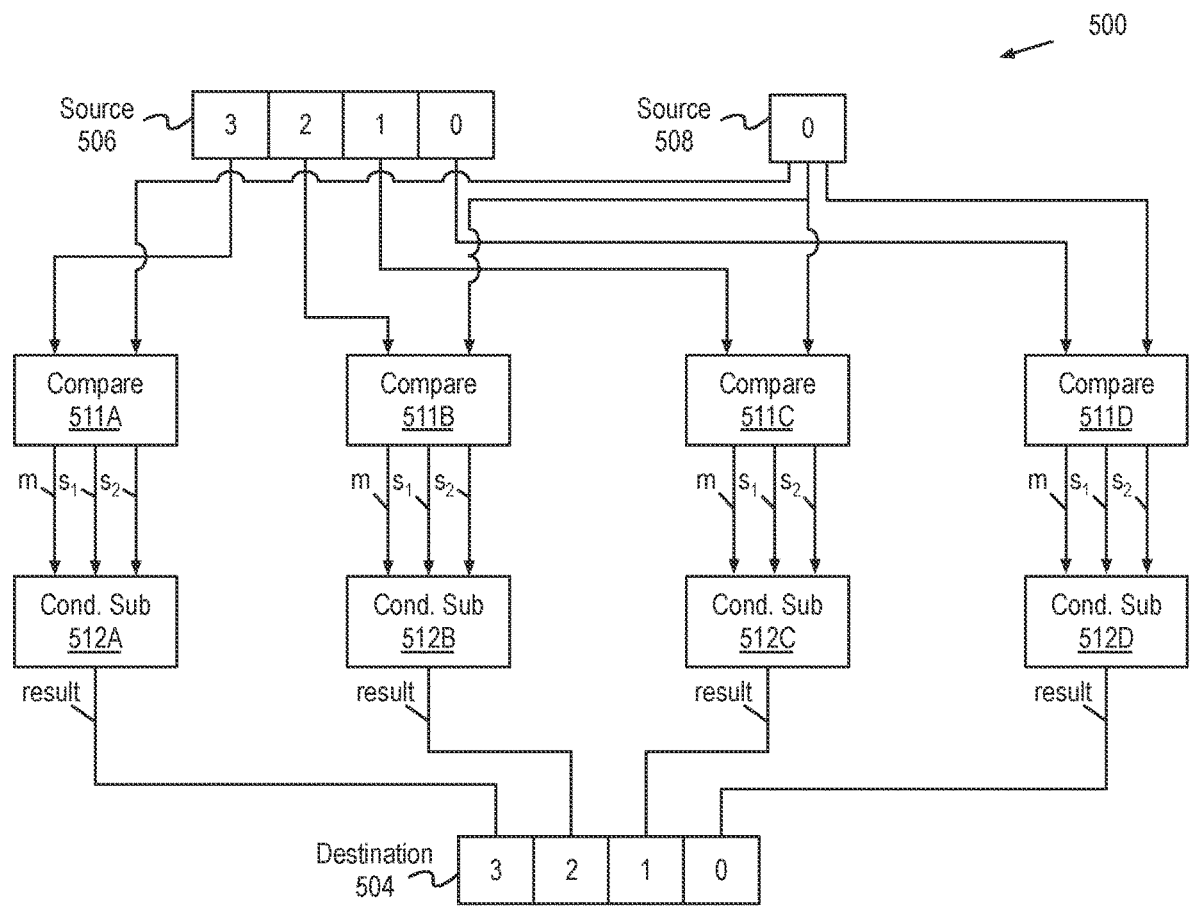
FIG. 5 illustrates circuitry to perform a conditional subtraction instruction, according to an embodiment.

FIG. 5 illustrates circuitry 500 to perform a conditional subtraction instruction, according to an embodiment. Circuitry 500, illustrated in block diagram, performs a conditional subtraction operation on a first source 506 having multiple packed data elements and a second source 508, which may be a single 64-bit or 32-bit data element. An element-wise compare operation is performed using comparator circuits 511A-511D to determine whether a respective element of the first source 506 is greater than or equal to the element of the second source 508. Conditional subtraction circuits 512A-512D can then each output either ($S_1-S_2$) or $S_1$ depending on the value of the mask bit that is output from the comparator circuits 511A-511D. A destination 504 can then store the result that is output from each of the conditional subtraction circuits 512A-512D.

Figure 6:
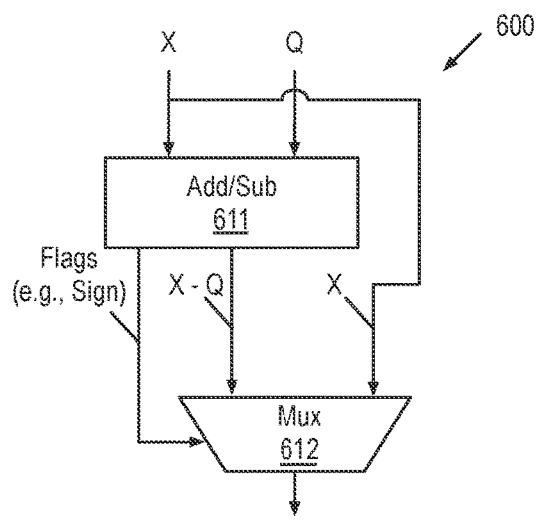
FIG. 6 illustrates circuitry to perform a conditional subtraction instruction, according to an embodiment.

FIG. 6 illustrates circuitry 600 to perform a conditional subtraction instruction, according to an embodiment. Circuitry 600 represents a single lane in a single instruction multiple data (SIMD) datapath within a SIMD execution unit of a CPU or GPU. Circuitry 600 can be used to implement a conditional subtraction instruction described herein using an adder/subtractor circuit 611 in conjunction with a multiplexer circuit 612, such as a 2:1 multiplexer. The subtract block performs tmp=X−Q, and provides output flags indicative of the result, such, for example, negative (sign) or zero. The multiplexer circuit 612 selects input value X for output if the result of the subtraction operation was negative. Otherwise, the multiplexer circuit 612 selects the result of the subtraction operation (tmp=X−Q) for output. A conditional subtraction instruction performed using circuitry 600 is amenable to single-cycle operation. Multiple instances of circuitry 600 may be found within an arithmetic logic unit (ALU) of a CPU or GPU depending on the number of physical SIMD lanes that are supported. Additionally, circuitry 600 may be used in the SIMD back-end of a GPU having support for a single instruction multiple thread (SIMT) execution model.

Figure 7A:
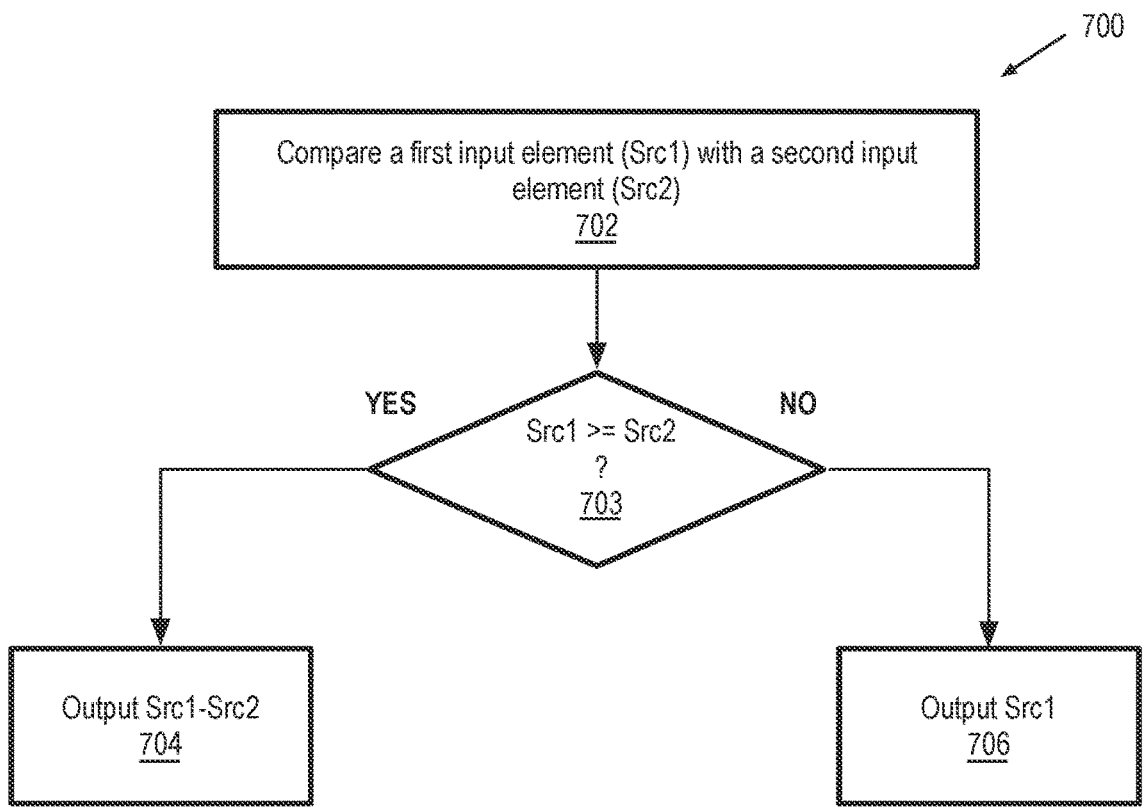
FIG. 7A-7B illustrates methods to perform conditional subtraction, according to embodiments.
Figure 7B:
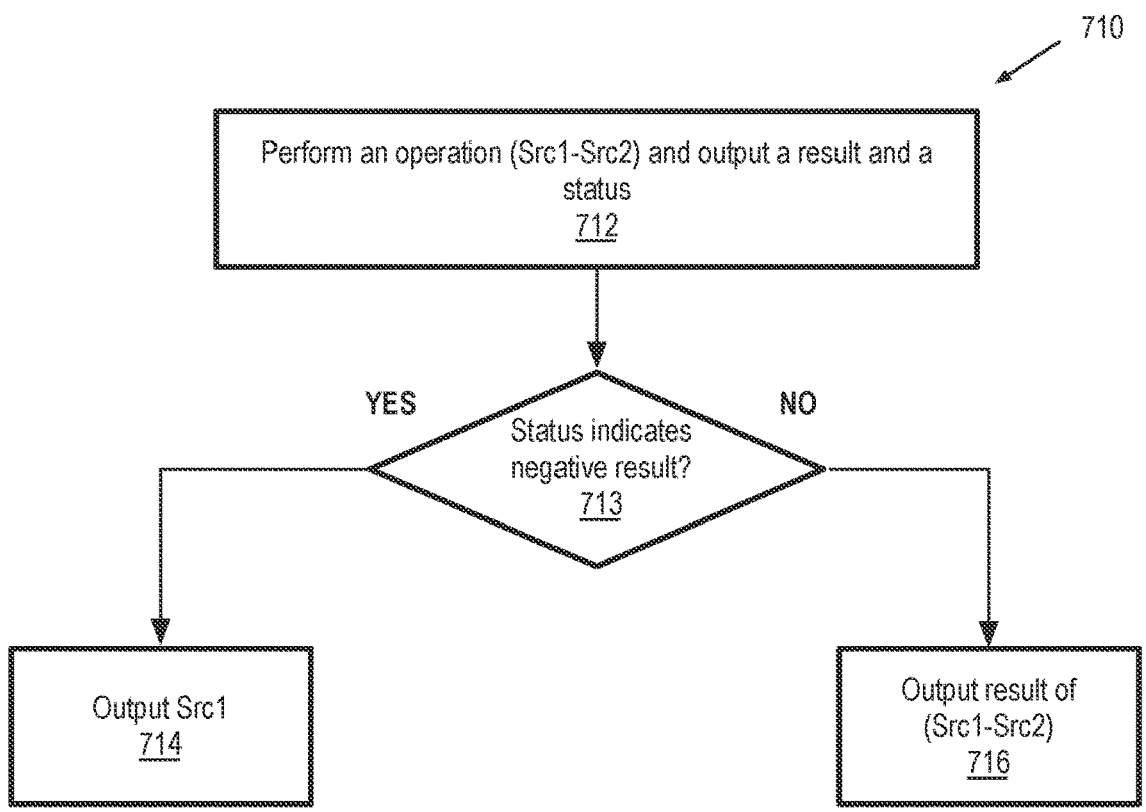

FIG. 7A-7B illustrates methods 700, 710 to perform conditional subtraction, according to embodiments. As described above, single cycle instruction can be implemented using a variety of techniques and can be presented in multiple forms. Method 700 of FIG. 7A corresponds with operations performed by circuitry 400 of FIG. 4 and circuitry 500 of FIG. 5. Method 710 of FIG. 7B corresponds with operations performed by circuitry 600 of FIG. 6. The operations of the methods 700, 710 are element-wise operations that are performed for each enabled element, thread, channel, and/or lane of instruction execution. Operations for multiple elements, threads, channels, and/or lanes can be performed concurrently for an instruction, with the number of parallel operations determined based on the size of the data elements and the instruction width.

As shown in FIG. 7A, execution circuitry of a processing resource (e.g., CPU, GPU, etc.) can compare a first input element (Src1) with a second input element (Src2), as shown at block 702. As indicated at block 703, based on the outcome of the comparison the circuitry will output a result of a subtraction operation (Src1−Src2), as shown at block 704, or output the first input element (Src1) as shown at block 706. The comparison shown at block 702 can be performed using comparator circuits 411A-411D as in FIG. 4 or comparator circuits 511A-511D as in FIG. 5, with the number of comparator circuits used for a specific instruction being determined by the execution lanes associated with the instruction. The subtraction operation at block 704 can be performed using conditional subtraction circuits 412A-412D as in FIG. 4 or conditional subtraction circuits 512A-512D as in FIG. 5, with the number of comparator circuits used for a specific instruction being determined by the execution lanes associated with the instruction.

As shown in FIG. 7B, execution circuitry of a processing resource (e.g., CPU, GPU, etc.) can perform a subtraction operation (Src1−Src2) on a first input element (Src1) and a second input element (Src2) and outputs a result and a status, as shown at block 712. The result is the result of the subtraction operation (Src1−Src2) and the status includes a sign flag that indicates whether the result is a negative result. The subtraction result and status can be determined using an adder/subtractor circuit 611 as in FIG. 6. If the status indicates a negative result (e.g., negative/sign flag is set), as determined at block 713, the execution circuitry will select the value of the first input element (Src1) for output, as shown at block 714. If the status does not indicate a negative result, the circuitry can select the result of the subtraction operation (Src1−Src2) and output the result, as shown at block 716.

A conditional subtraction instruction as described herein can be used to reduce the number of instructions of used in key HE operations, as indicated by the exemplary butterfly operations shown in Table 10 and Table 11.

TABLE 10

Forward NTT Butterfly

```
01: inline void FwdButterfly(__m512i* X, __m512i* Y, __m512i W_op, __m512i
    W_precon,__m512i neg_modulus, __m512i twice_modulus) {
02:   __m512i zero = _mm512_set1_epi64(0);
03:   // Reduce X from [0, twice_modulus) to [0, modulus)
04:     __m512i tmp = _mm512_sub_epi64 (*X, twice_modulus) ;
05:     *X = _mm512_min_epu64 (tmp, *X) ;
06:     __m512i Q = _mm512_madd52hi_epu64(zero, W_precon, *Y) ;
07:     __m512i W_Y = _mm512_madd52lo_epu64(zero, W_op, *Y) ;
08:     __m512i T = _mm512_madd52lo_epu64(W_Y, Q, neg_modulus);
09:
10:   // Discard high 12 bits; deals with case when
11    // W*Y < Q*p in the low 52 bits.
12:   _mm512i two_pow_52_min_1 = _mm512_set1_epi64((1ULL << 52) - 1);
13:
14:   T = _mm512_and_epi64(T, two_pow_52_min_1);
15:   __m512i twice_mod_minus_T = _mm512_sub_epi64(twice_modulus, T);
16:   *Y = _mm512_add_epi64(*X, twice_mod_minus_T);
17:   *X = _mm512_add_epi64(*X, T);
18: }
```

TABLE 11

Forward NTT Butterfly with Conditional Subtraction Instruction

```
01: inline void FwdButterfly(__m512i* X, __m512i* Y, __m512i W_op, __m512i
    W_precon,__m512i neg_modulus, __m512i twice_modulus, __m512i modulus) {
02:     __m512i zero = _mm512_set1_epi64(0);
03:     // Reduce X from [0, twice_modulus) to [0, modulus)
04:     *X = _mm512_cond_sub_epi64 (*X, twice_modulus) ;
05:     __m512i Q = _mm512_madd52hi_epu64(zero, W_precon, *Y);
06:     __m512i W_Y = _mm512_madd52lo_epu64(zero, W_op, *Y);
07:     __m512i T = _mm512_madd52lo_epu64(W_Y, Q, neg_modulus);
08:
09:     // Discard high 12 bits; deals with case when
10:     // W*Y < Q*p in the low 52 bits.
11      _mm512i two_pow_52_min_1 = _mm512_set1_epi64((1ULL << 52) − 1);
12:
13:     T = _mm512_and_epi64(T, two_pow_52_min_1);
14:     __m512i twice_mod_minus_T = _mm512_sub_epi64(twice_modulus, T);
15:     *Y = _mm512_add_epi64(*X, twice_mod_minus_T);
16:     *X = _mm512_add_epi64(*X, T);
17: }
```

The instructions on line 04 and line 05 of Table 10 are intrinsic instructions that map directly to associated assembly instructions to perform an element-wise subtraction of packed 64-bit integers (line 04) and an element-wise selection of the minimum result of two source inputs (line 5), where the specified source inputs are the src1 input of the subtraction instruction and the packed result of the subtraction operation. Line 04 and line 05 of Table 10 can be replaced with an intrinsic instruction_mm512_con_sub_epi64, shown on line 04 of Table 11, which maps to a conditional subtraction instruction described herein (e.g., vpcondsubuq zmm1, zmm2/m512 of Table 6 above). Improving the efficiency of a frequently used operation by eliminating an instruction can result in a significant improvement in the performance of HE operations that make use of the NTT butterfly operation.

An exemplary inverse butterfly implementation can also be improved via the use of a conditional subtraction instruction as described herein, as shown in Table 12 and Table 13.

TABLE 12

Inverse NTT Butterfly

```
01: inline void InvButterfly(__m512i* X, __m512i* Y, __m512i W_op, __m512i
    W_precon,__m512i neg_modulus, __m512i twice_modulus) {
02:     __m512i Y_minus_2q = _mm512_sub_epi64(*Y, twice_modulus);
03:     __m512i T = _mm512_sub_epi64(*X, Y_minus_2q);
04:     *X = _mm512_add_epi64(*X, Y_minus_2q);
05:     __mmask8 sign_bits = _mm512_movepi64_mask(*X);
06:     *X = _mm512_mask_add_epi64(*X, sign_bits, *X, twice_modulus);
07:     __m512i zero = _mm512_set1_epi64(0);
08:     __m512i Q = _mm512_madd52hi_epu64(zero, W_precon, T);
09:     __m512i Q_p = _mm512_madd52lo_epu64(zero, Q, neg_modulus);
10:     *Y = _mm512_madd52lo_epu64(Q_p, W_op, T);
11      _mm512i two_pow_52_min_1 = _mm512_set1_epi64((1ULL << 52) − 1);
12:     *Y = _mm512_and_epi64(*Y, two_pow_52_min_1);
13: }
```

TABLE 13

Inverse NTT Butterfly with Conditional Subtraction Instruction

```
01: inline void InvButterfly(__m512i* X, __m512i* Y, __m512i W_op, __m512i
    W_precon,__m512i neg_modulus, __m512i twice_modulus) {
02:     __m512i Y_minus_2q = _mm512_sub_epi64(*Y, twice_modulus);
03:     __m512i T = _mm512_sub_epi64(*X, Y_minus_2q);
04:     *X = _mm512_add_epi64(*X, Y) ;
05:     *X = _mm512_cond_sub_epi64(*X, twice_modulus)
06:     __m512i zero = _mm512_set1_epi64(0);
07:     __m512i Q = _mm512_madd52hi_epu64(zero, W_precon, T);
08:     __m512i Q_p = _mm512_madd52lo_epu64(zero, Q, neg_modulus);
09:     *Y = _mm512_madd52lo_epu64(Q_p, W_op, T);
10:     _mm5121 two_pow_52_min_1 = _mm512_set1_epi64((1ULL << 52) − 1);
11       *Y = _mm512_and_epi64(*Y, two_pow_52_min_1);
12: }
```

As shown above, three instructions (line 04-06) of an exemplary inverse NTT butterfly operation may be reduced to two instructions (line 04-05) via the use of a conditional subtraction instruction described herein. Additionally, the efficiency of an element-wise modular multiplication routine can also be improved via the use of a conditional subtraction instruction, as shown in Table 14 and Table 15 below.

TABLE 14

Element-wise Modular Multiplication

```
01: __m512i EltwiseMultMod(const __m512i v_operand1, const __m512i v_operand2,
      const __m512i v_modulus, const __m512i vbarr_lo, uint64_t N) {
02:      // Compute product
03:      __m512i vprod_hi = _mm512_hexl_mulhi_epi<64>(v_operand1, c_operand2);
04:      __m512i vprod_lo = _mm512_mullo_epi64(v_operand1, v_operand2);
05:
06:      __m512i c1 = _mm512_hexl_shrdi_epi64(vprod_lo, vprod_hi,
             static_cast<int> (N - 1));
07:      // L - N + 1 == 64, so we only need high 64 bits
08:      __m512i c3 = _mm512_hexl_mulhi_epi<64>(cl, vbarr_lo);
09:
10:      // C4 = prod_lo - (p * c3)_lo
11       __m512i v_result = _mm512_mullo_epi64(c3, v_modulus);
12:      vresult = _mm512_sub_epi64(vprod_lo, v_result);
13:
14:      // Conditional subtraction
15:      __m512i tmp = _mm512_sub_epi64(v_result, v_modulus);
16:      v_result = _mm512_min_epu64(v_result, tmp);
17:      return v_result;
18: }
```

TABLE 15

Element-wise Modular Multiplication with Conditional Subtraction Instruction

```
01: __m512i EltwiseMultMod (const __m512i v_operand1, const __m512i v_operand2,
      const __m512i v_modulus, const __m512i vbarr_lo, uint64_t N) {
02:      // Compute product
03:      __m512i vprod_hi = _mm512_hexl_mulhi_epi<64>(v_operand1, v_operand2);
04:      __m512i vprod_lo = _mm512_mullo_epi64(v_operand1, v_operand2);
05:
06:      __m512i c1 = _mm512_hexl_shrdi_epi64(vprod_lo, vprod_hi,
             static_cast<int>(N - 1));
07:      // L - N + 1 == 64, so we only need high 64 bits
08:      __m512i c3 = _mm512_hexl_mulhi_epi<64>(cl, vbarr_lo);
09:
10:      // C4 = prod_lo - (p * c3)_lo
11:      __m512i v_result = _mm512_mullo_epi64(c3, v_modulus);
12:      vresult = _mm512_sub_epi64(vprod_lo, v_result);
13:
14:      // Conditional subtraction
15:    v_result = _mm512_cond_sub_epi64(v_result, v_modulus)
16:    return v_result;
17: }
```

The element-wise multiplication of Table 14 and Table 15 computes returns ((v_operand1*v_operand2) mod v_modulus) in each packed 64-bit integer slot. The conditional subtraction operation of lines 15-16 of Table 14 can be replaced with a single condition subtraction instruction, as shown in line 15 of Table 15.

The above embodiments provide a processor comprising first circuitry to decode an instruction into a decoded instruction, the instruction to indicate a first source operand and a second source operand and second circuitry including a processing resource to execute the decoded instruction. Responsive to the decoded instruction, the processing resource outputs a result of first source operand data minus second source operand data in response to a determination by the processing resource that the first source operand data is greater than or equal to the second source operand data. Otherwise, the processing resource outputs the first source operand data. The processor and associated processing resource may be a CPU, GPU, or another type of processor, or an accelerator device. The processing resource may also reside in an FPGA coupled with a CPU, GPU, and/or accelerator device. The first source operand specifies a location of the first source operand data and the second source operand specifies a location of the second source operand data, where the locations for operand data can be a register location or a memory location. The first source operand data is a packed data type including multiple data elements, while the second source operand data can be a single data element of a packed data type including multiple data elements. The processing resource outputs a result of a first data element of the first source operand data minus a corresponding element of the second source operand data in response to a determination by the processing resource that the first data element of the first source operand data is greater than or equal to the corresponding data element of the second source operand data. Otherwise, the processing element will output the first data element of the first source operand data. The data elements can be 32-bit integer data elements or 64-bit integer data elements. The data elements can be signed or unsigned integers. The packed data type can be 128-bits, 256-bits, or 512-bits in width. The instruction can also indicate a destination operand to specify a destination. The processing resource can output the result of first source operand data minus second source operand data or the first source operand data to the destination. The destination operand can specify a 128-bit register, a 256-bit register, or a 512-bit register. The destination operand can also specify a memory location that is configured to store a 128-bit, 256-bit, or 512-bit packed data type.

The above embodiments also provide an apparatus comprising decoder circuitry to decode a single instruction, the single instruction to include a field for an identifier of a first source operand, a field for an identifier of a second source operand, a field for an identifier of a destination operand, and a field for an opcode, the opcode to indicate execution circuitry is to perform a conditional subtraction operation on first source operand data associated with the first source operand and second source operand data associated with the second source operand. The apparatus includes execution circuitry to execute the decoded instruction according to the opcode, the execution circuitry to output a result of the first source operand data minus the second source operand data in response to a determination by the execution circuitry that the first source operand data is greater than or equal to the second source operand data, otherwise execution circuitry is to output the first source operand data. The field for the identifier of the first source operand can identify a vector register or a memory location. The execution circuitry to perform a subtraction operation to subtract one or more data elements of the second source operand data from one or more corresponding data elements of the first source operand data and conditionally output a subtraction result for each corresponding set of one or more data elements based on a status bit generated based on the subtraction operation.

A further embodiment provides method comprising decoding an instruction via decoder circuitry of a processor, the instruction decoded into a decoded instruction, the instruction to indicate a first source operand and a second source operand and executing the decoded instruction via execution circuitry of the processors, wherein executing the decoded instruction includes outputting a result of first source operand data minus second source operand data in response to a determination by the execution circuitry that the first source operand data is greater than or equal to the second source operand data, otherwise outputting, via the execution circuitry, the first source operand data. The first source operand specifies a location of the first source operand data, the first source operand data is a packed data type including multiple data elements, the second source operand specifies a location of the second source operand data, and the second source operand data includes at least one data element. The method additionally includes outputting a result of a first data element of the first source operand data minus a corresponding element of the second source operand data in response to a determination by the execution circuitry that the first data element of the first source operand data is greater than or equal to the corresponding element of the second source operand data and otherwise output the first data element of the first source operand data. In one embodiment the second source operand data is a packed data type including multiple data elements and executing the decoded instruction includes outputting a result for multiple data elements of the first source operand and corresponding data elements of the second source operand.

One embodiment provides a data processing system comprising a network interface, a memory device storing instructions, and one or more processors coupled with the network interface and the memory device. The one or more processors include a general-purpose processor (e.g., CPU) and/or a general-purpose graphics processor (GPGPU). The instructions to provide a homomorphic encryption acceleration library including primitives to accelerate homomorphic encryption operations. The one or more processors, responsive to execution of the instructions, are configured to receive a set of encrypted data via the network interface, wherein the set of encrypted data is encrypted via a homomorphic encryption scheme and perform an arithmetic operation on the set of encrypted data via a primitive provided by the homomorphic encryption acceleration library, the arithmetic operation including a conditional subtraction operation. The conditional subtraction operation is performed via a single instruction executed by the one or more processors, where the single instruction is provided by an instruction set architecture of the one or more processors. The conditional subtraction operation includes a number-theoretic transform operation and the conditional subtraction operation is associated with a butterfly operation of the number-theoretic transform operation. The arithmetic operation also includes an inverse number-theoretic transform operation and the conditional subtraction operation can also be performed in associated with an inverse butterfly operation of the number-theoretic transform operation. In one embodiment the conditional subtraction operation can also be associated with an element-wise modular multiplication operation and/or an element-wise modular addition operation.

Other processors, devices, and/or systems may also be provided based on the details above and the architectural details provided below.

CPU and GPU System Architecture

Figure 8:
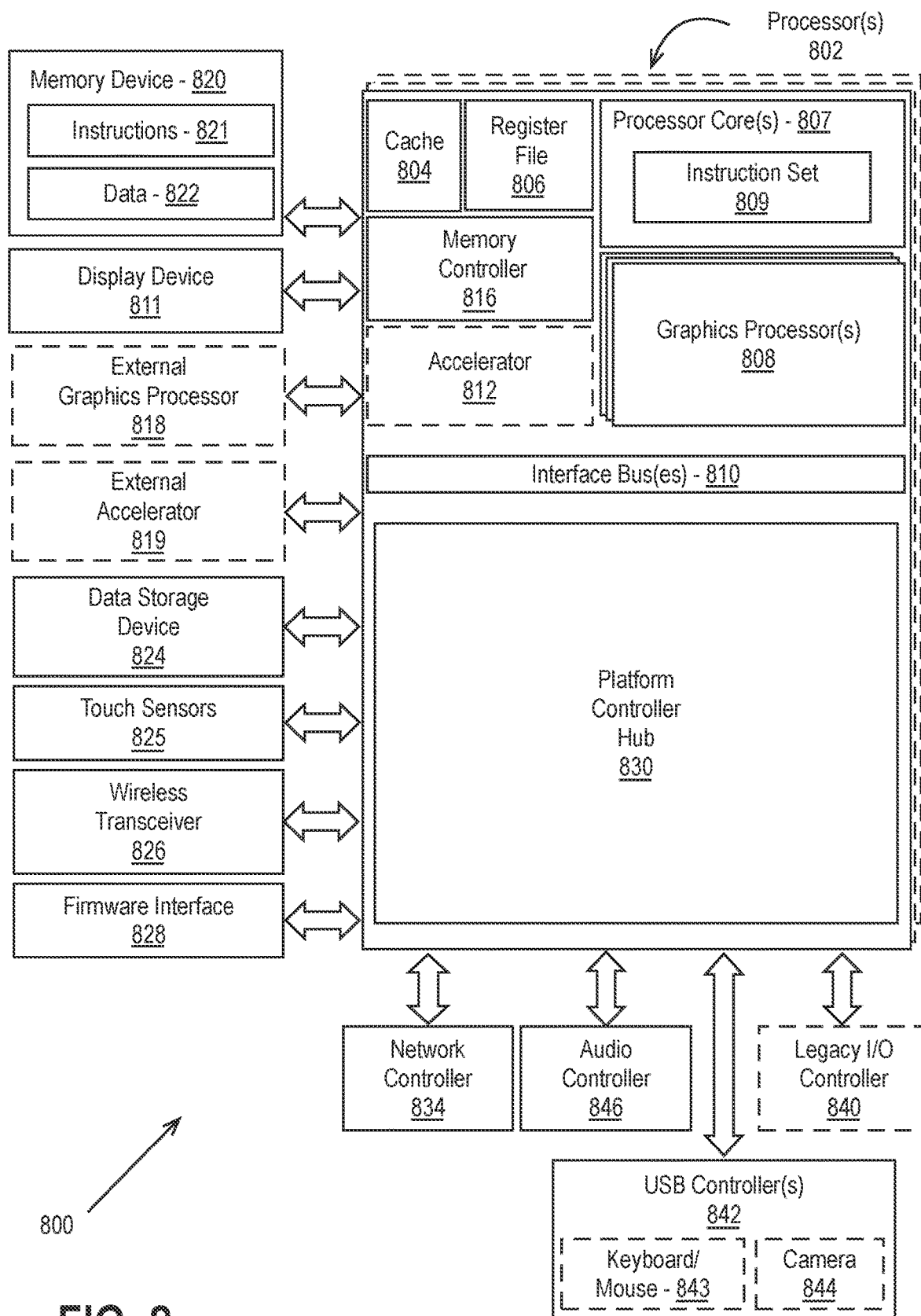
FIG. 8 illustrates a method to perform conditional subtraction, according to an embodiment.

FIG. 8 is a block diagram of a processing system 800, according to an embodiment. Processing system 800 may be used in a single processor desktop system, a multiprocessor workstation system, or a server system having a large number of processors 802 or processor cores 807. In one embodiment, the processing system 800 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 800 can include, couple with, or be integrated within: a server-based gaming platform; a game console, including a game and media console; a mobile gaming console, a handheld game console, or an online game console. In some embodiments the processing system 800 is part of a mobile phone, smart phone, tablet computing device or mobile Internet-connected device such as a laptop with low internal storage capacity. Processing system 800 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 800 includes or is part of a television or set top box device. In one embodiment, processing system 800 can include, couple with, or be integrated within a self-driving vehicle such as a bus, tractor trailer, car, motor or electric power cycle, plane or glider (or any combination thereof). The self-driving vehicle may use processing system 800 to process the environment sensed around the vehicle.

In some embodiments, the one or more processors 802 each include one or more processor cores 807 to process instructions which, when executed, perform operations for system or user software. In some embodiments, at least one of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). One or more processor cores 807 may process a different instruction set 809, which may include instructions to facilitate the emulation of other instruction sets. Processor core 807 may also include other processing devices, such as a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 can be additionally included in processor 802 and may include different types of registers for storing different types of data (e.g., integer registers, floating-point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the processing system 800. The interface bus 810, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 802 include an integrated memory controller 816 and a platform controller hub 830. The memory controller 816 facilitates communication between a memory device and other components of the processing system 800, while the platform controller hub (PCH) 830 provides connections to I/O devices via a local I/O bus.

The memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the processing system 800, to store data 822 and instructions 821 for use when the one or more processors 802 executes an application or process. Memory controller 816 also couples with an optional external graphics processor 818, which may communicate with the one or more graphics processors 808 in processors 802 to perform graphics and media operations. In some embodiments, graphics, media, and or compute operations may be assisted by an accelerator 812 which is a coprocessor that can be configured to perform a specialized set of graphics, media, or compute operations. For example, in one embodiment the accelerator 812 is a matrix multiplication accelerator used to optimize machine learning or compute operations. In one embodiment the accelerator 812 is a ray-tracing accelerator that can be used to perform ray-tracing operations in concert with the graphics processor 808. In one embodiment, an external accelerator 819 may be used in place of or in concert with the accelerator 812.

In some embodiments a display device 811 can connect to the processor(s) 802. The display device 811 can be one or more of an internal display device, as in a mobile electronic device or a laptop device or an external display device attached via a display interface (e.g., DisplayPort, etc.). In one embodiment the display device 811 can be a head mounted display (TIMID) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., non-volatile memory, volatile memory, hard disk drive, flash memory, NAND, 3D NAND, 3D XPoint, etc.). The data storage device 824 can connect via a storage interface (e.g., SATA) or via a peripheral bus, such as a Peripheral Component Interconnect bus (e.g., PCI, PCI express). The touch sensors 825 can include touch screen sensors, pressure sensors, or fingerprint sensors. The wireless transceiver 826 can be a Wi-Fi transceiver, a Bluetooth transceiver, or a mobile network transceiver such as a 3G, 4G, 5G, or Long-Term Evolution (LTE) transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high-definition audio controller. In one embodiment the processing system 800 includes an optional legacy I/O controller 840 for coupling legacy (e.g., Personal System 2 (PS/2)) devices to the system. The platform controller hub 830 can also connect to one or more Universal Serial Bus (USB) controllers 842 connect input devices, such as keyboard and mouse 843 combinations, a camera 844, or other USB input devices.

It will be appreciated that the processing system 800 shown is exemplary and not limiting, as other types of data processing systems that are differently configured may also be used. For example, an instance of the memory controller 816 and platform controller hub 830 may be integrated into a discrete external graphics processor, such as the external graphics processor 818. In one embodiment the platform controller hub 830 and/or memory controller 816 may be external to the one or more processor(s) 802. For example, the processing system 800 can include an external memory controller 816 and platform controller hub 830, which may be configured as a memory controller hub and peripheral controller hub within a system chipset that is in communication with the processor(s) 802.

For example, circuit boards ("sleds") can be used on which components such as CPUs, memory, and other components are placed are designed for increased thermal performance. In some examples, processing components such as the processors are located on a top side of a sled while near memory, such as DIMNs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling. Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 800 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 9A:
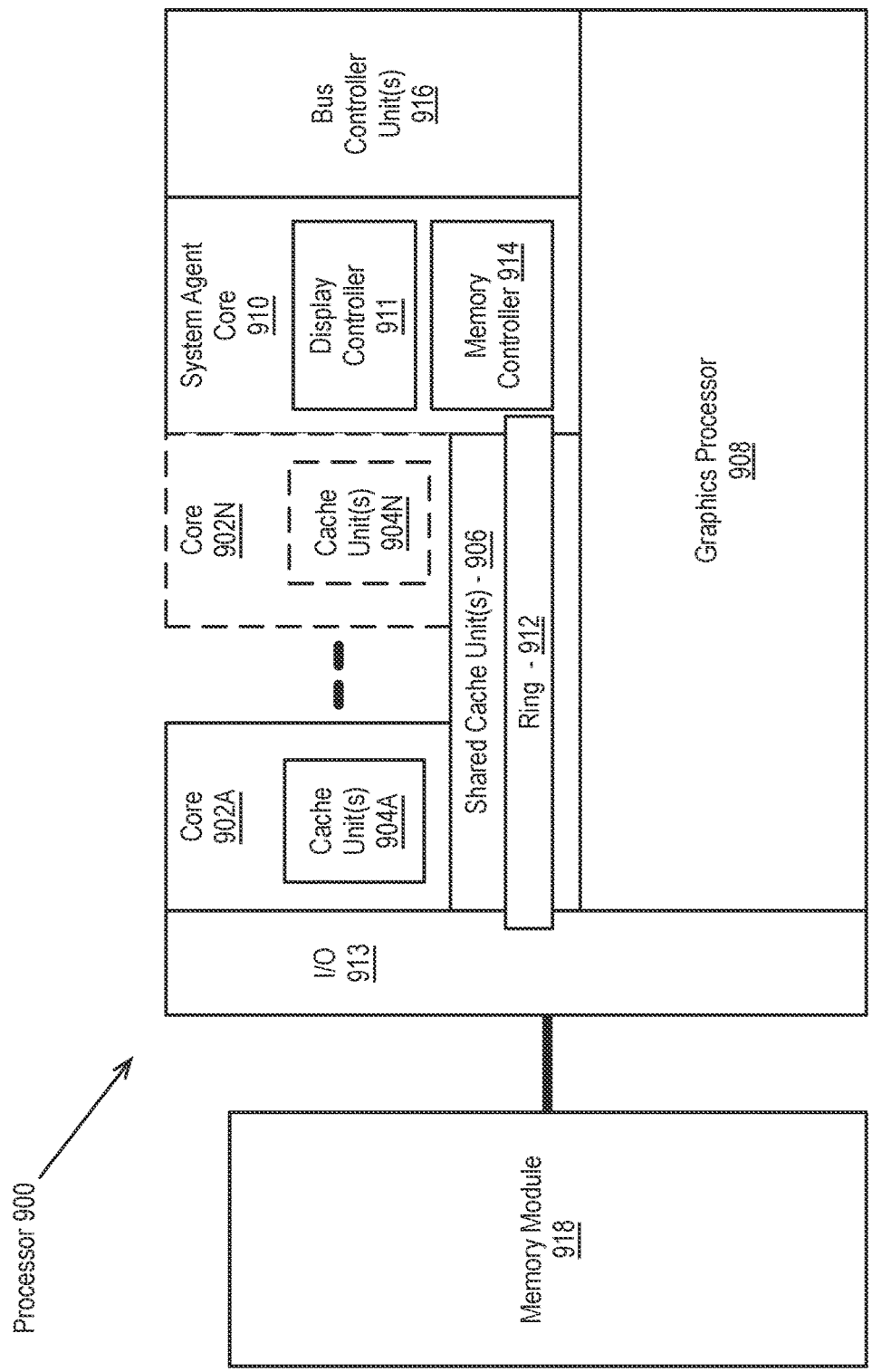
FIG. 9A-9B illustrate computing systems and graphics processors provided by embodiments described herein.
Figure 9B:
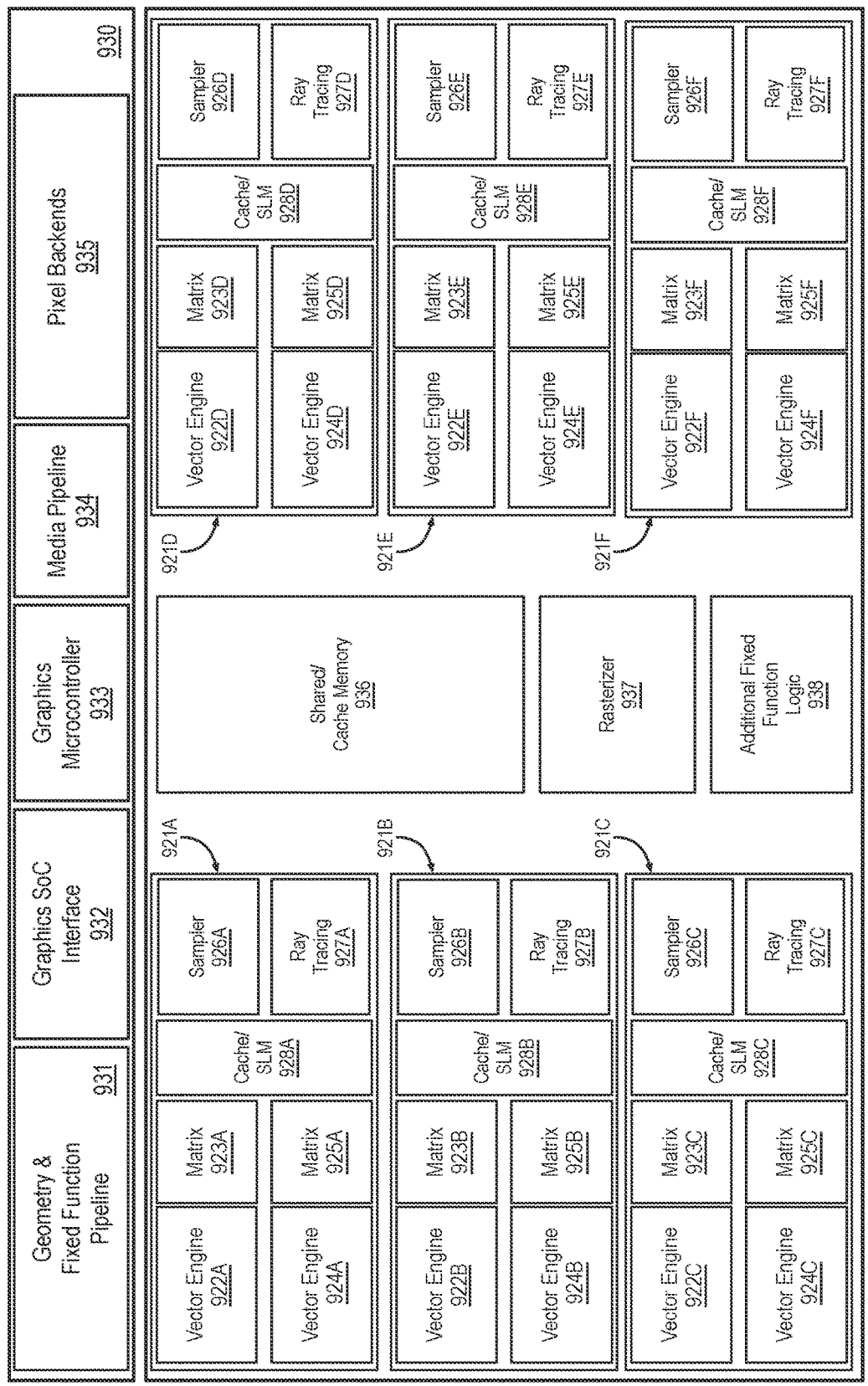

FIG. 9A-9B illustrate computing systems and graphics processors provided by embodiments described herein. The elements of FIG. 9A-9B having the same reference numbers (or names) as the elements of any other figure herein can operate or function in any manner similar to that described elsewhere herein but are not limited to such.

FIG. 9A is a block diagram of an embodiment of a processor 900 having one or more processor cores 902A-902N, one or more integrated memory controllers 914, and an integrated graphics processor 908. Processor 900 includes at least one core 902A and can additionally include additional cores up to and including additional core 902N, as represented by the dashed lined boxes. Each of processor cores 902A-902N includes one or more internal cache units 904A-904N. In some embodiments each processor core also has access to one or more shared cached units 906. The internal cache units 904A-904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A-904N.

In some embodiments, processor 900 may also include a set of one or more bus controller units 916 and a system agent core 910. The one or more bus controller units 916 manage a set of peripheral buses, such as one or more PCI or PCI express busses. System agent core 910 provides management functionality for the various processor components. In some embodiments, system agent core 910 includes one or more integrated memory controllers 914 to manage access to various external memory devices (not shown).

In some embodiments, one or more of the processor cores 902A-902N include support for simultaneous multi-threading. In such embodiment, the system agent core 910 includes components for coordinating and operating cores 902A-902N during multi-threaded processing. System agent core 910 may additionally include a power control unit (PCU), which includes logic and components to regulate the power state of processor cores 902A-902N and graphics processor 908.

In some embodiments, processor 900 additionally includes a graphics processor 908 to execute graphics processing operations. In some embodiments, the graphics processor 908 couples with the set of shared cache units 906, and the system agent core 910, including the one or more integrated memory controllers 914. In some embodiments, the system agent core 910 also includes a display controller 911 to drive graphics processor output to one or more coupled displays. In some embodiments, display controller 911 may also be a separate module coupled with the graphics processor via at least one interconnect, or may be integrated within the graphics processor 908.

In some embodiments, a ring-based interconnect 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring-based interconnect 912 via an I/O link 913.

The exemplary I/O link 913 represents at least one of multiple varieties of I/O interconnects, including an on package I/O interconnect which facilitates communication between various processor components and a memory module 918, such as an eDRAM module or high-bandwidth memory (HBM) memory modules. In one embodiment the memory module 918 can be an eDRAM module and each of the processor cores 902A-902N and graphics processor 908 can use the memory module 918 as a shared LLLC. In one embodiment, the memory module 918 is an HBM memory module that can be used as a primary memory module or as part of a tiered or hybrid memory system that also includes double data rate synchronous DRAM, such as DDR5 SDRAM, and/or persistent memory (PMem). The processor 900 can include multiple instances of the I/O link 913 and memory module 918.

In some embodiments, processor cores 902A-902N are homogenous cores executing the same instruction set architecture. In another embodiment, processor cores 902A-902N are heterogeneous in terms of instruction set architecture (ISA), where one or more of processor cores 902A-902N execute a first instruction set, while at least one of the other cores executes a subset of the first instruction set or a different instruction set. In one embodiment, processor cores 902A-902N are heterogeneous in terms of microarchitecture, where one or more cores having a relatively higher power consumption couple with one or more power cores having a lower power consumption. In one embodiment, processor cores 902A-902N are heterogeneous in terms of computational capability. Additionally, processor 900 can be implemented on one or more chips or as an SoC (system-on-a-chip) integrated circuit having the illustrated components, in addition to other components.

FIG. 9B is a block diagram of hardware logic of a graphics processor core block 919, according to some embodiments described herein. The graphics processor core block 919 is exemplary of one partition of a graphics processor. A graphics processor as described herein may include multiple graphics core blocks based on target power and performance envelopes. Each graphics processor core block 919 can include a function block 930 coupled with multiple execution cores 921A-921F that include modular blocks of fixed function logic and general-purpose programmable logic. The graphics processor core block 919 also includes shared/cache memory 936 that is accessible by all execution cores 921A-921F, rasterizer logic 937, and additional fixed function logic 938.

In some embodiments, the function block 930 includes a geometry/fixed function pipeline 931 that can be shared by all execution cores in the graphics processor core block 919. In various embodiments, the geometry/fixed function pipeline 931 includes a 3D geometry pipeline a video front-end unit, a thread spawner and global thread dispatcher, and a unified return buffer manager, which manages unified return buffers. In one embodiment the function block 930 also includes a graphics SoC interface 932, a graphics microcontroller 933, and a media pipeline 934. The graphics SoC interface 932 provides an interface between the graphics processor core block 919 and other core blocks within a graphics processor or compute accelerator SoC. The graphics microcontroller 933 is a programmable sub-processor that is configurable to manage various functions of the graphics processor core block 919, including thread dispatch, scheduling, and pre-emption. The media pipeline 934 includes logic to facilitate the decoding, encoding, pre-processing, and/or post-processing of multimedia data, including image and video data. The media pipeline 934 implement media operations via requests to compute or sampling logic within the execution cores 921-921F. One or more pixel backends 935 can also be included within the function block 930. The pixel backends 935 include a cache memory to store pixel color values and can perform blend operations and lossless color compression of rendered pixel data.

In one embodiment the SoC interface 932 enables the graphics processor core block 919 to communicate with general-purpose application processor cores (e.g., CPUs) and/or other components within an SoC or a system host CPU that is coupled with the SoC via a peripheral interface. The SoC interface 932 also enables communication with off-chip memory hierarchy elements such as a shared last level cache memory, system RAM, and/or embedded on-chip or on-package DRAM. The SoC interface 932 can also enable communication with fixed function devices within the SoC, such as camera imaging pipelines, and enables the use of and/or implements global memory atomics that may be shared between the graphics processor core block 919 and CPUs within the SoC. The SoC interface 932 can also implement power management controls for the graphics processor core block 919 and enable an interface between a clock domain of the graphics processor core block 919 and other clock domains within the SoC. In one embodiment the SoC interface 932 enables receipt of command buffers from a command streamer and global thread dispatcher that are configured to provide commands and instructions to each of one or more graphics cores within a graphics processor. The commands and instructions can be dispatched to the media pipeline 934 when media operations are to be performed, the geometry and fixed function pipeline 931 when graphics processing operations are to be performed. When compute operations are to be performed, compute dispatch logic can dispatch the commands to the execution cores 921A-921F, bypassing the geometry and media pipelines.

The graphics microcontroller 933 can be configured to perform various scheduling and management tasks for the graphics processor core block 919. In one embodiment the graphics microcontroller 933 can perform graphics and/or compute workload scheduling on the various graphics parallel engines within execution unit (EU) arrays 922A-922F, 924A-924F within the execution cores 921A-921F. In this scheduling model, host software executing on a CPU core of an SoC including the graphics processor core block 919 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 933 can also facilitate low-power or idle states for the graphics processor core block 919, providing the graphics processor core block 919 with the ability to save and restore registers within the graphics processor core block 919 across low-power state transitions independently from the operating system and/or graphics driver software on the system.

The graphics processor core block 919 may have greater than or fewer than the illustrated execution cores 921A-921F, up to N modular execution cores. For each set of N execution cores, the graphics processor core block 919 can also include shared/cache memory 936, which can be configured as shared memory or cache memory, rasterizer logic 937, and additional fixed function logic 938 to accelerate various graphics and compute processing operations.

Within each execution cores 921A-921F is set of execution resources that may be used to perform graphics, media, and compute operations in response to requests by graphics pipeline, media pipeline, or shader programs. The graphics execution cores 921A-921F include multiple vector engines 922A-922F, 924A-924F, matrix acceleration units 923A-923F, 925A-925D, cache/shared local memory (SLM), a sampler 926A-926F, and a ray tracing unit 927A-927F.

The vector engines 922A-922F, 924A-924F are general-purpose graphics processing units capable of performing floating-point and integer/fixed-point logic operations in service of a graphics, media, or compute operation, including graphics, media, or compute/GPGPU programs. The vector engines 922A-922F, 924A-924F can operate at variable vector widths using SIMD, SIMT, or SIMT+SIMD execution modes. The matrix acceleration units 923A-923F, 925A-925D include matrix-matrix and matrix-vector acceleration logic that improves performance on matrix operations, particularly low and mixed precision (e.g., INT8, FP16) matrix operations used for machine learning. In one embodiment, each of the matrix acceleration units 923A-923F, 925A-925D includes one or more systolic arrays of processing elements that can perform concurrent matrix multiply or dot product operations on matrix elements.

The sampler 925A-925F can read media or texture data into memory and can sample data differently based on a configured sampler state and the texture/media format that is being read. Threads executing on the vector engines 922A-922F, 924A-924F or matrix acceleration units 923A-923F, 925A-925D can make use of the cache/SLM 928A-928F within each execution core. The cache/SLM 928A-928F can be configured as cache memory or as a pool of shared memory that is local to each of the respective execution cores 921A-921F. The ray tracing units 927A-927F within the execution cores 921A-921F include ray traversal/intersection circuitry for performing ray traversal using bounding volume hierarchies (BVHs) and identifying intersections between rays and primitives enclosed within the BVH volumes. In one embodiment the ray tracing units 927A-927F include circuitry for performing depth testing and culling (e.g., using a depth buffer or similar arrangement). In one implementation, the ray tracing units 927A-927F perform traversal and intersection operations in concert with image denoising, at least a portion of which may be performed using an associated matrix acceleration unit 923A-923F, 925A-925D.

Figure 10A:
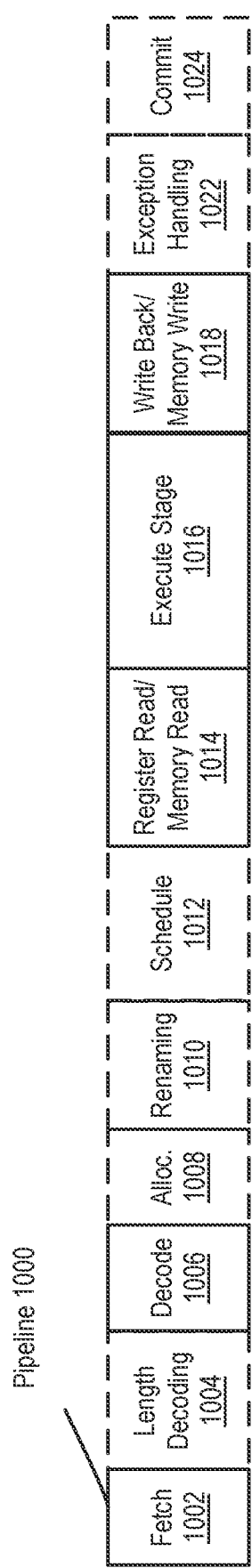
FIG. 10A-10B illustrate an exemplary in-order pipeline and an exemplary register renaming, out-of-order issue/execution pipeline of a processor and an associated processor architecture.
Figure 10B:
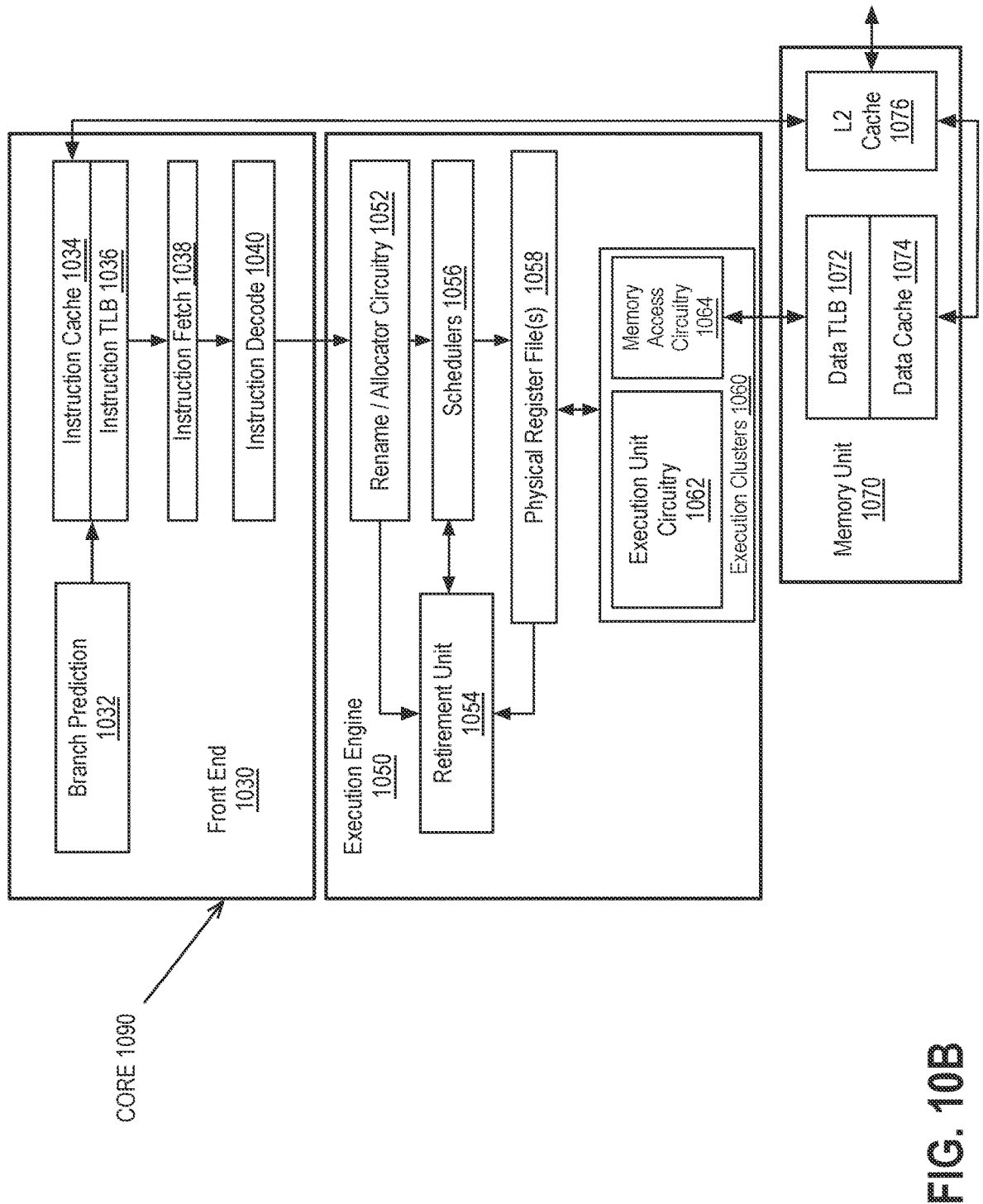

FIG. 10A is a block diagram illustrating an exemplary in-order pipeline and an exemplary register renaming, out-of-order issue/execution pipeline of a processor described herein. FIG. 10B is a block diagram illustrating architecture for a processor core that can be configured as an in-order architecture core or a register renaming, out-of-order issue/execution architecture core. Given that the in-order aspect is a subset of the out-of-order aspect, the out-of-order aspect will be described.

As shown in FIG. 10A, a processor pipeline 1000 includes a fetch stage 1002, an optional length decode stage 1004, a decode stage 1006, an optional allocation stage 1008, an optional renaming stage 1010, a scheduling (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, during the decode stage 1006, the one or more fetched instructions may be decoded, addresses (e.g., load store unit (LSU) addresses) using forwarded register ports may be generated, and branch forwarding (e.g., immediate offset or link register (LR)) may be performed. In one embodiment, the decode stage 1006 and the register read/memory read stage 1014 may be combined into one pipeline stage. In one embodiment, during the execute stage 1016, the decoded instructions may be executed, LSU address/data pipelining to an Advanced Microcontroller Bus (AHB) interface may be performed, multiply and add operations may be performed, arithmetic operations with branch results may be performed, etc.

As shown in FIG. 10B a processor core 1090 can include front end unit circuitry 1030 coupled to execution engine circuitry 1050, both of which are coupled to memory unit circuitry 1070. The processor core 1090 can be one of processor cores 902A-902N as in FIG. 9A. The processor core 1090 may be a reduced instruction set computing (RISC) core, a complex instruction set computing (CISC) core, a very long instruction word (VLIW) core, or a hybrid or alternative core type. As yet another option, the processor core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction unit circuitry 1032 coupled to an instruction cache unit circuitry 1034, which is coupled to an instruction translation lookaside buffer (TLB) 1036, which is coupled to instruction fetch unit circuitry 1038, which is coupled to decode unit circuitry 1040. In one embodiment, the instruction cache unit circuitry 1034 is included in the memory unit circuitry 1070 rather than the front end unit circuitry 1030. The decode unit circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1040 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the processor core 1090 includes a microcode ROM (not shown) or other medium that stores microcode for certain macroinstructions (e.g., in decode unit circuitry 1040 or otherwise within the front end unit circuitry 1030). In one embodiment, the decode unit circuitry 1040 includes a micro-operation (micro-op) or operation cache (not shown) to hold/cache decoded operations, micro-tags, or micro-operations generated during the decode or other stages of the processor pipeline 1000. The decode unit circuitry 1040 may be coupled to rename/allocator unit circuitry 1052 in the execution engine circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some embodiments, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is overlapped by the retirement unit circuitry 1054 (also known as a retire queue or a retirement queue) to illustrate various ways in which register renaming and out-of-order execution may be implemented (e.g., using a reorder buffer(s) (ROB (s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit circuitry 1062 and a set of one or more memory access circuitry 1064. The execution unit circuitry 1062 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1064). It should also be understood that where separate pipelines are used, one or more of these pipelines may be out-of-order issue/execution and the rest in-order.

In some embodiments, the execution engine circuitry 1050 may perform load store unit (LSU) address/data pipelining to an Advanced Microcontroller Bus (AHB) interface (not shown), and address phase and writeback, data phase load, store, and branches.

The set of memory access circuitry 1064 is coupled to the memory unit circuitry 1070, which includes data TLB unit circuitry 1072 coupled to a data cache circuitry 1074 coupled to a level 2 (L2) cache circuitry 1076. In one exemplary embodiment, the memory access circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to level 2 (L2) cache circuitry 1076 in the memory unit circuitry 1070. In one embodiment, the instruction cache circuitry 1034 and the data cache circuitry 1074 are combined into a single instruction and data cache (not shown) in L2 cache circuitry 1076, a level 3 (L3) cache unit circuitry (not shown), and/or main memory. The L2 cache circuitry 1076 is coupled to one or more other levels of cache and eventually to a main memory.

The processor core 1090 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the processor core 1090 includes logic to support a packed data instruction set extension (e.g., AVX1, AVX2, AVX512), thereby allowing the operations used by many multimedia applications or high-performance compute applications, including homomorphic encryption applications, to be performed using packed or vector data types.

The processor core 1090 of FIG. 10B can implement the processor pipeline 1000 of FIG. 10A as follows: 1) the instruction fetch circuitry 1038 performs the fetch and length decoding stages 1002 and 1004; 2) the instruction decode unit circuitry 1040 performs the decode stage 1006; 3) the rename/allocator unit circuitry 1052 performs the allocation stage 1008 and renaming stage 1010; 4) the scheduler unit(s) circuitry 1056 performs the schedule stage 1012; 5) the physical register file(s) circuitry 1058 and the memory unit circuitry 1070 perform the register read/memory read stage 1014; the execution cluster 1060 perform the execute stage 1016; 6) the memory unit circuitry 1070 and the physical register file(s) circuitry 1058 perform the write back/memory write stage 1018; 7) various units (unit circuitry) may be involved in the exception handling stage 1022; and 8) the retirement unit circuitry 1054 and the physical register file(s) circuitry 1058 perform the commit stage 1024.

Figure 11:
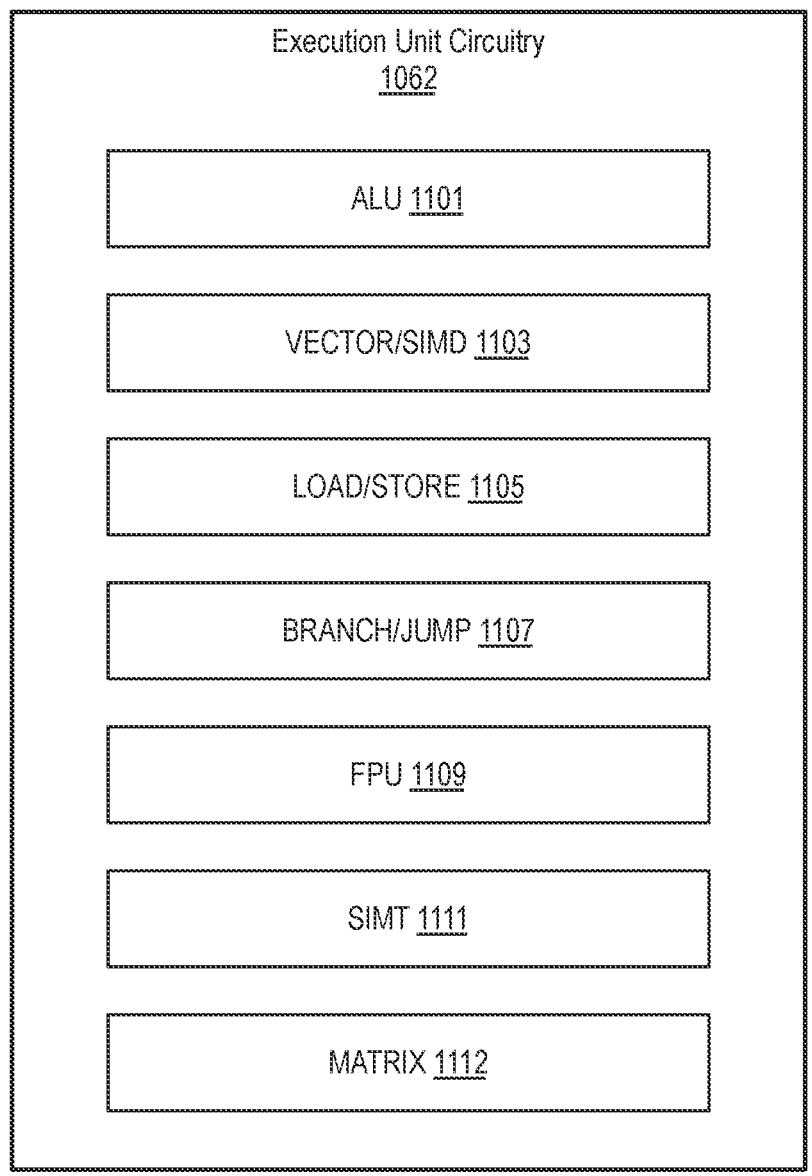
FIG. 11 illustrates execution unit circuitry according to embodiments described herein.

FIG. 11 illustrates execution unit circuitry, such as execution unit circuitry 1062 of FIG. 10B, according to embodiments described herein. As illustrated, execution unit circuitry 1062 may include one or more ALU circuits 1101, vector/SIMD unit circuits 1103, load/store unit circuits 1105, branch/jump unit circuits 1107, and/or FPU circuits 1109. Where the execution unit circuitry 1062 is configurable to perform GPGPU parallel compute operations, the execution unit circuitry can additionally include SIMT circuits 1111 and/or matrix acceleration circuits 1112. ALU circuits 1101 perform integer arithmetic and/or Boolean operations. Vector/SIMD unit circuits 1103 perform vector/SIMD operations on packed data (such as SIMD/vector registers). Load/store unit circuits 1105 execute load and store instructions to load data from memory into registers or store from registers to memory. Load/store unit circuits 1105 may also generate addresses. Branch/jump unit circuits 1107 cause a branch or jump to a memory address depending on the instruction. FPU circuits 1109 perform floating-point arithmetic. In some embodiments, SIMT circuits 1111 enable the execution unit circuitry 1062 to execute SIMT GPGPU compute programs using one or more ALU circuits 1101 and/or Vector/SIMD unit circuits 1103. In some embodiments, execution unit circuitry 1062 includes matrix acceleration circuits 1112 including hardware logic of one or more of the matrix acceleration units 923A-923F, 925A-925D of FIG. 9B. The width of the execution unit(s) circuitry 1062 varies depending upon the embodiment and can range from 16 bits to 4,096 bits. In some embodiments, two or more smaller execution units are logically combined to form a larger execution unit (e.g., two 128-bit execution units are logically combined to form a 256-bit execution unit).

Figure 12:
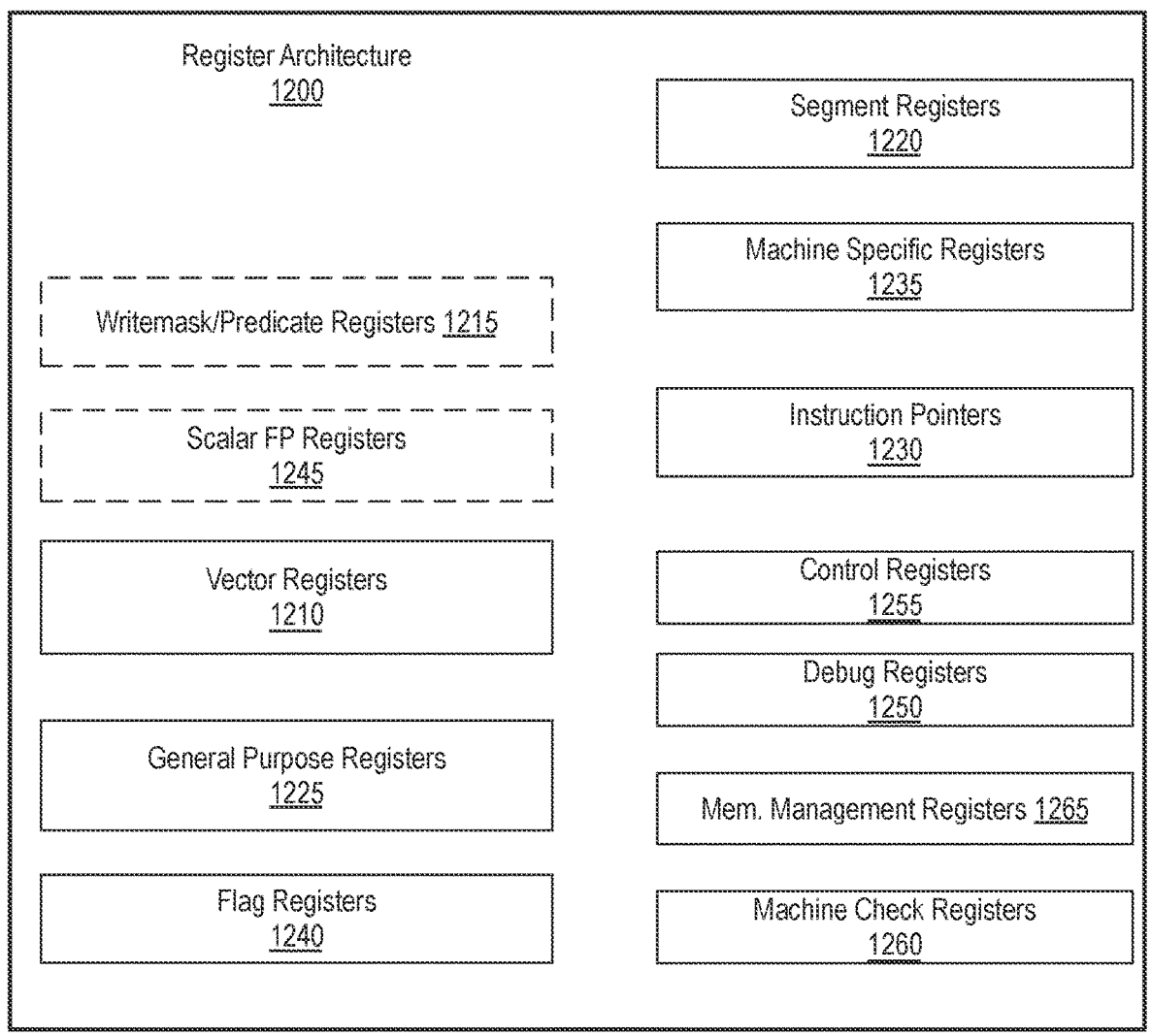
FIG. 12 is a block diagram of a register architecture according to some embodiments.

FIG. 12 is a block diagram of a register architecture 1200 according to some embodiments. As illustrated, there are vector registers 1210 that vary from 128-bit to 1,024 bits width. In some embodiments, the vector registers 1210 are physically 512-bits and, depending upon the mapping, only some of the lower bits are used. For example, in some embodiments, the vector registers 1210 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1200 includes writemask/predicate registers 1215. For example, in some embodiments, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1215 corresponds to a data element position of the destination. In other embodiments, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1200 includes scalar floating-point register 1245 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some embodiments, the one or more flag registers 1240 are called program status and control registers.

Segment registers 1220 contain segment points for use in accessing memory. In some embodiments, these registers are referenced by the names CS, DS, SS, ES, FS, and GS.

Machine specific registers (MSRs) 1235 control and report on processor performance. Most MSRs 1235 handle system related functions and are not accessible to an application program. Machine check registers 1260 consist of control, status, and error reporting MSRs that are used to detect and report on hardware errors.

One or more instruction pointer registers 1230 store an instruction pointer value. Control register(s) 1255 (e.g., CR0-CR4) determine the operating mode of a processor and the characteristics of a currently executing task. Debug registers 1250 control and allow for the monitoring of a processor or core's debugging operations.

Memory management registers 1265 specify the locations of data structures used in protected mode memory management. These registers may include a GDTR, IDRT, task register, and a LDTR register.

Alternative embodiments use wider or narrower registers and can also use more, less, or different register files and registers.

Exemplary Instruction Formats

Instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figures 13, 14:
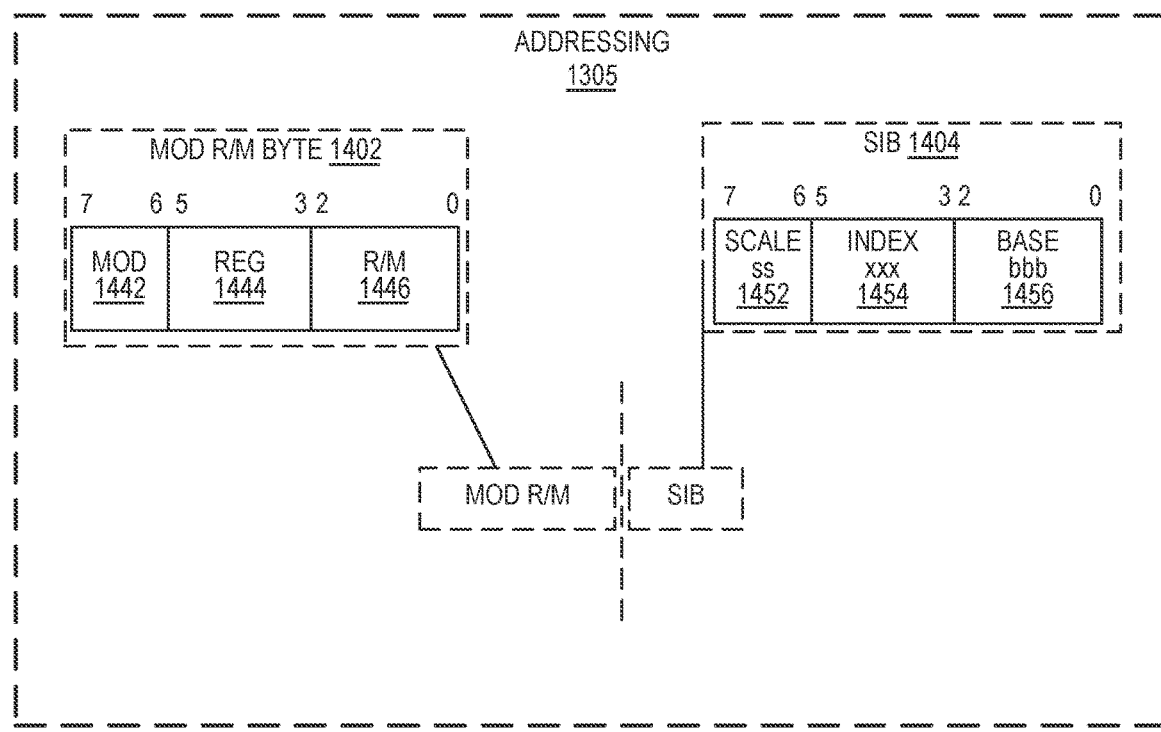
FIG. 13 illustrates embodiments of an instruction format, according to an embodiment.
FIG. 14 illustrates embodiments of the addressing field of the instruction format.

FIG. 13 illustrates embodiments of an instruction format, according to an embodiment. As illustrated, an instruction may include multiple components including, but not limited to one or more fields for: one or more prefixes 1301, an opcode 1303, addressing information 1305 (e.g., register identifiers, memory addressing information, etc.), a displacement value 1307, and/or an immediate 1309. Note that some instructions utilize some or all of the fields of the format whereas others may only use the field for the opcode 1303. In some embodiments, the order illustrated is the order in which these fields are to be encoded, however, it should be appreciated that in other embodiments these fields may be encoded in a different order, combined, etc.

The prefix(es) field(s) 1301, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some embodiments, a primary opcode encoded in the opcode field 1303 is 1, 2, or 3 bytes in length. In other embodiments, a primary opcode can be a different length. An additional 3-bit opcode field is sometimes encoded in another field.

The addressing field 1305 is used to address one or more operands of the instruction, such as a location in memory or one or more registers.

FIG. 14 illustrates embodiments of the addressing field 1305. In this illustration, an optional ModR/M byte 1402 and an optional Scale, Index, Base (SIB) byte 1404 are shown. The ModR/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register field 1444, and R/M field 1446.

The content of the MOD field 1442 distinguishes between memory access and non-memory access modes. In some embodiments, when the MOD field 1442 has a value of b11, a register-direct addressing mode is utilized, and otherwise register-indirect addressing is used.

The register field 1444 may encode either the destination register operand or a source register operand or may encode an opcode extension and not be used to encode any instruction operand. The content of register index field 1444, directly or through address generation, specifies the locations of a source or destination operand (either in a register or in memory). In some embodiments, the register field 1444 is supplemented with an additional bit from a prefix (e.g., prefix 1301) to allow for greater addressing.

The R/M field 1446 may be used to encode an instruction operand that references a memory address or may be used to encode either the destination register operand or a source register operand. Note the R/M field 1446 may be combined with the MOD field 1442 to dictate an addressing mode in some embodiments.

The SIB byte 1404 includes a scale field 1452, an index field 1454, and a base field 1456 to be used in the generation of an address. The scale field 1452 indicates scaling factor. The index field 1454 specifies an index register to use. In some embodiments, the index field 1454 is supplemented with an additional bit from a prefix (e.g., prefix 1301) to allow for greater addressing. The base field 1456 specifies a base register to use. In some embodiments, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1307 provides this value. Additionally, in some embodiments, a displacement factor usage is encoded in the MOD field of the addressing field 1305 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1307.

In some embodiments, an immediate field 1309 specifies an immediate for the instruction. An immediate may be encoded as a 1-byte value, a 2-byte value, a 4-byte value, etc.

Figure 15:
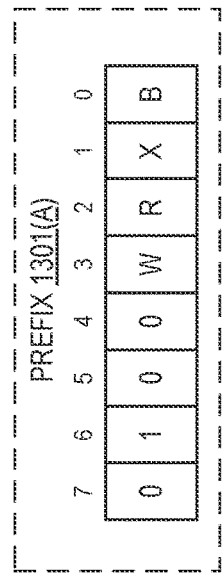
FIG. 15 illustrates embodiments of a first prefix of the instruction format.

FIG. 15 illustrates embodiments of a first prefix 1301(A). In some embodiments, the first prefix 1301(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1444 and MOD R/M R/M field 1446 alone can each only address 8 registers.

In the first prefix 1301(A), bit position 2 (R) may an extension of the MOD R/M reg field 1444 and may be used to modify the ModR/M reg field 1444 when that field encodes a general-purpose register, a 64-bit packed data register (e.g., a SSE register), or a control or debug register. R is ignored when Mod R/M byte 1402 specifies other registers or defines an extended opcode.

Bit position 1 (X) X bit may modify the SIB byte index field 1454.

Bit position B (B) B may modify the base in the Mod R/M R/M field 1446 or the SIB byte base field 1456; or it may modify the opcode register field used for accessing general purpose registers (e.g., general-purpose registers 1225).

Figure 16A:
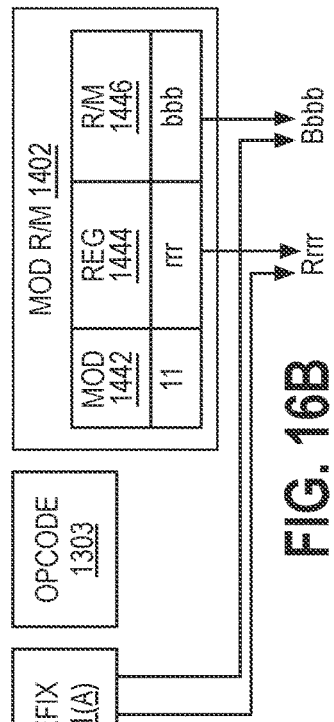
FIGS. 16A-16D illustrate use of the R, X, and B fields of the first prefix, according to some embodiments.
Figure 16B:
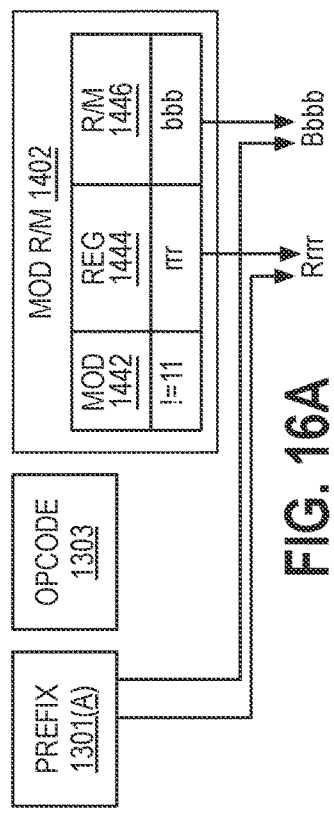
Figure 16D:
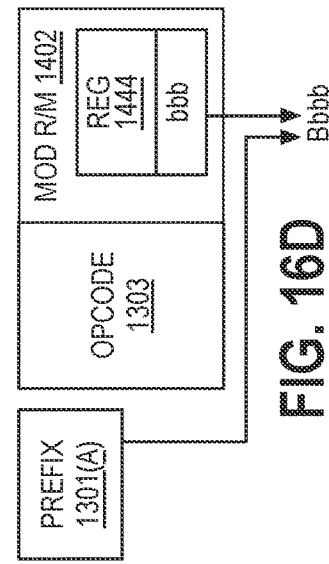
Figure 16C:
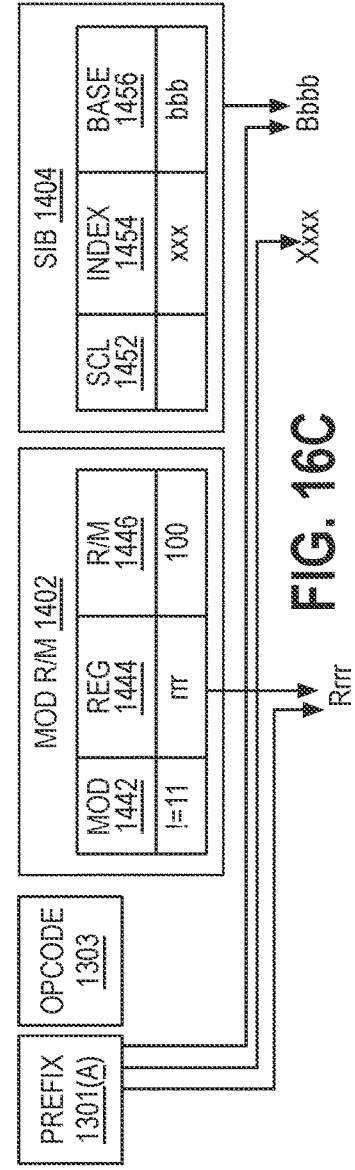

FIGS. 16A-16D illustrate use of the R, X, and B fields of the first prefix 1301(A), according to some embodiments. FIG. 16A illustrates R and B from the first prefix 1301(A) being used to extend the reg field 1444 and R/M field 1446 of the MOD R/M byte 1402 when the SIB byte 1404 is not used for memory addressing. FIG. 16B illustrates R and B from the first prefix 1301(A) being used to extend the reg field 1444 and R/M field 1446 of the MOD R/M byte 1402 when the SIB byte 1404 is not used (register-register addressing). FIG. 16C illustrates R, X, and B from the first prefix 1301(A) being used to extend the reg field 1444 of the MOD R/M byte 1402 and the index field 1454 and base field 1456 when the SIB byte 1404 being used for memory addressing. FIG. 16D illustrates B from the first prefix 1301(A) being used to extend the reg field 1444 of the MOD R/M byte 1402 when a register is encoded in the opcode 1303.

Figure 17A:
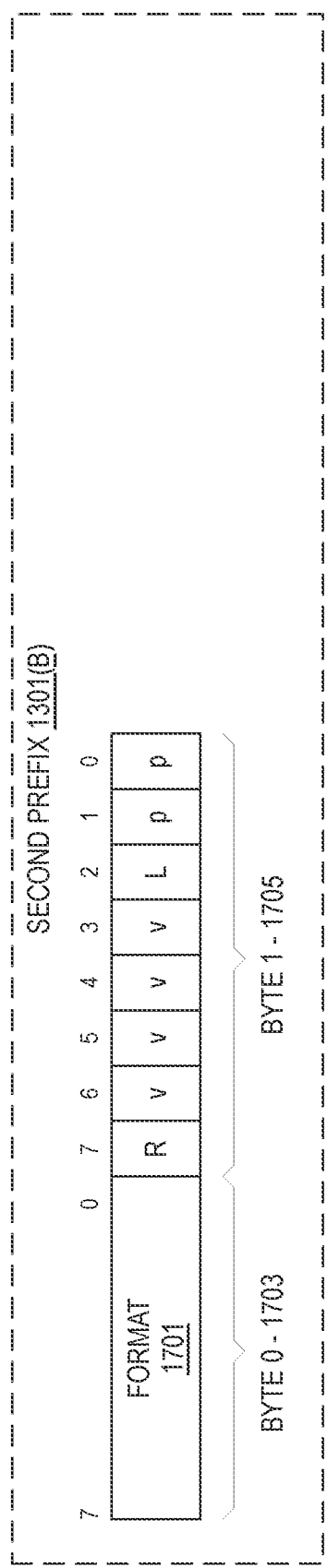
FIG. 17A-17B illustrate a second prefix, according to embodiments.
Figure 17B:
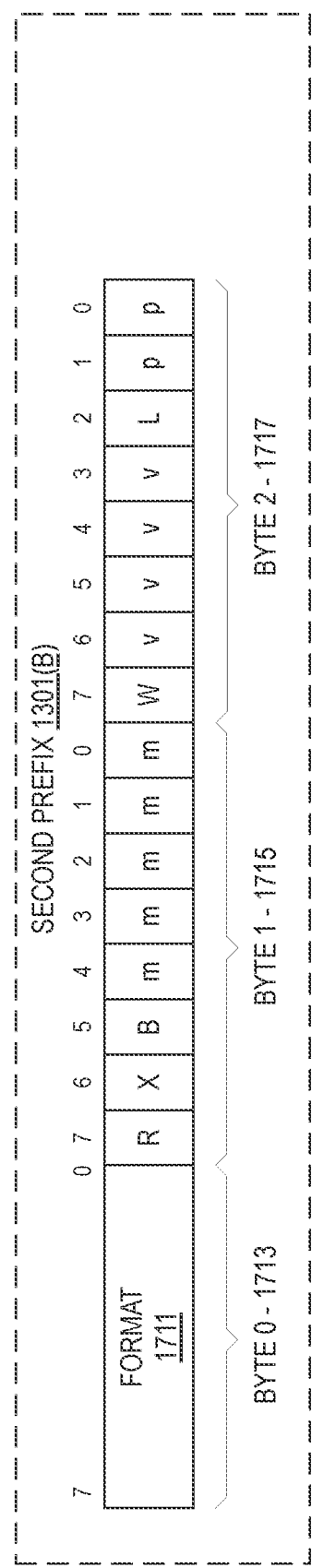

FIG. 17A-17B illustrate a second prefix 1301(B), according to embodiments. In some embodiments, the second prefix 1301(B) is an embodiment of a VEX prefix. The second prefix 1301(B) encoding allows instructions to have more than two operands, and allows SIMD vector registers (e.g., vector registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some embodiments, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17A illustrates embodiments of a two-byte form of the second prefix 1301(B). In one example, a format field 1701 (byte 0 1703) contains the value C5H. In one example, byte 1 1705 includes a "R" value in bit[7]. This value is the complement of the same value of the first prefix 1301(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (is complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

FIG. 17B illustrates embodiments of a three-byte form of the second prefix 1301(B). in one example, a format field 1711 (byte 0 1713) contains the value C4H. Byte 1 1715 includes in bits[7:5] "R," "X," and "B" which are the complements of the same values of the first prefix 1301(A). Bits[4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1717 is used similar to W of the first prefix 1301(A) including helping to determine promotable operand sizes. Bit[2] is used to dictate the length (L) of the vector (where a value of 0 is a scalar or 128-bit vector) and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

Figure 18:
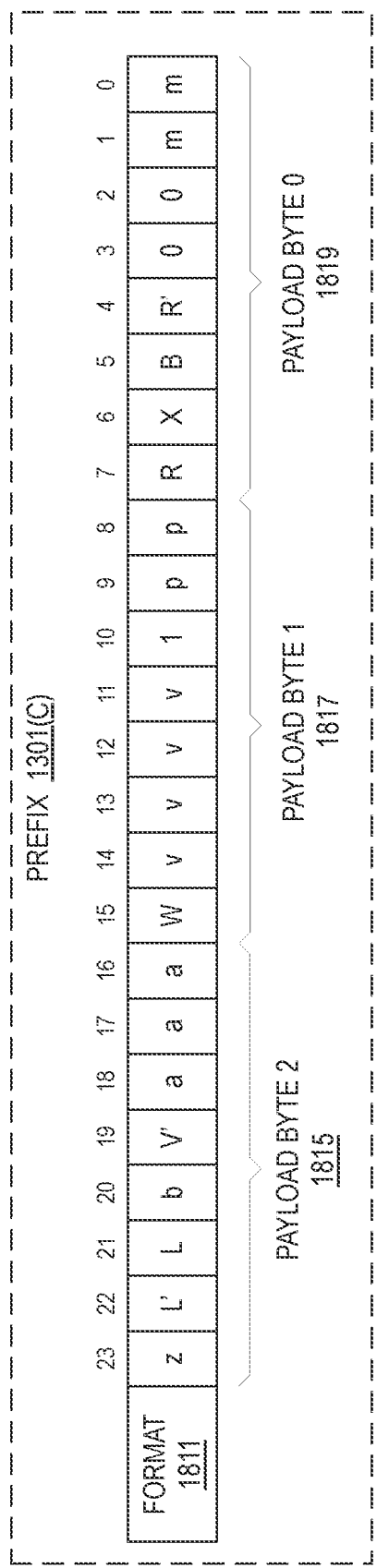
FIG. 18 illustrates a third prefix, according to embodiments.

FIG. 18 illustrates embodiments of a third prefix 1301(C). In some embodiments, the first prefix 1301(A) is an embodiment of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 0x62, which is a unique value that identifies a vector friendly instruction format. Subsequent bytes are referred to as payload bytes 1815, 1817, 1819 and collectively form a 24-bit value of P[23:0] providing specific capability in the form of one or more fields (detailed herein).

In some embodiments, P[1:0] of payload byte 1819 are identical to the low two mmmmm bits. P[3:2] are reserved in some embodiments. Bit P[4] (R') allows access to the high 16 vector register set when combined with P[7] and the ModR/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P[9:8] provide opcode extensionality equivalent to some legacy prefixes (e.g., 00=no prefix, 01=0x66, 10=0xF3, and 11=0xF2). P[10] in some embodiments is a fixed value of 1. P[14:11], shown as vvvv, may be used to: 1) encode the first source register operand, specified in inverted (is complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 1301(A) and second prefix 1301(B) and may serve as an opcode extension bit or operand size promotion.

P[18:16] specify the index of a register in the opmask (writemask) registers (e.g., writemask/predicate registers 1215). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1301(C) are detailed in the following tables.

TABLE 16

32-Register Support in 64-bit Mode

|  | 4 | 3 | [2:0] | REG. TYPE | COMMON USAGES |
|---|---|---|---|---|---|
| REG | R' | R | ModR/M reg | GPR, Vector | Destination or Source |

TABLE 16-continued

32-Register Support in 64-bit Mode

| | 4 | 3 | [2:0] | REG. TYPE | COMMON USAGES |
|---|---|---|---|---|---|
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 17

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 18

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | 2nd Source |
| RM | ModR/M R/M | k0-7 | 1st Source |
| {k1} | aaa | k0$^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired, as the mechanisms described herein are not limited in scope to any particular programming language. Additionally, the language may be a compiled or interpreted language.

The mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

ISA Emulation and Binary Translation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
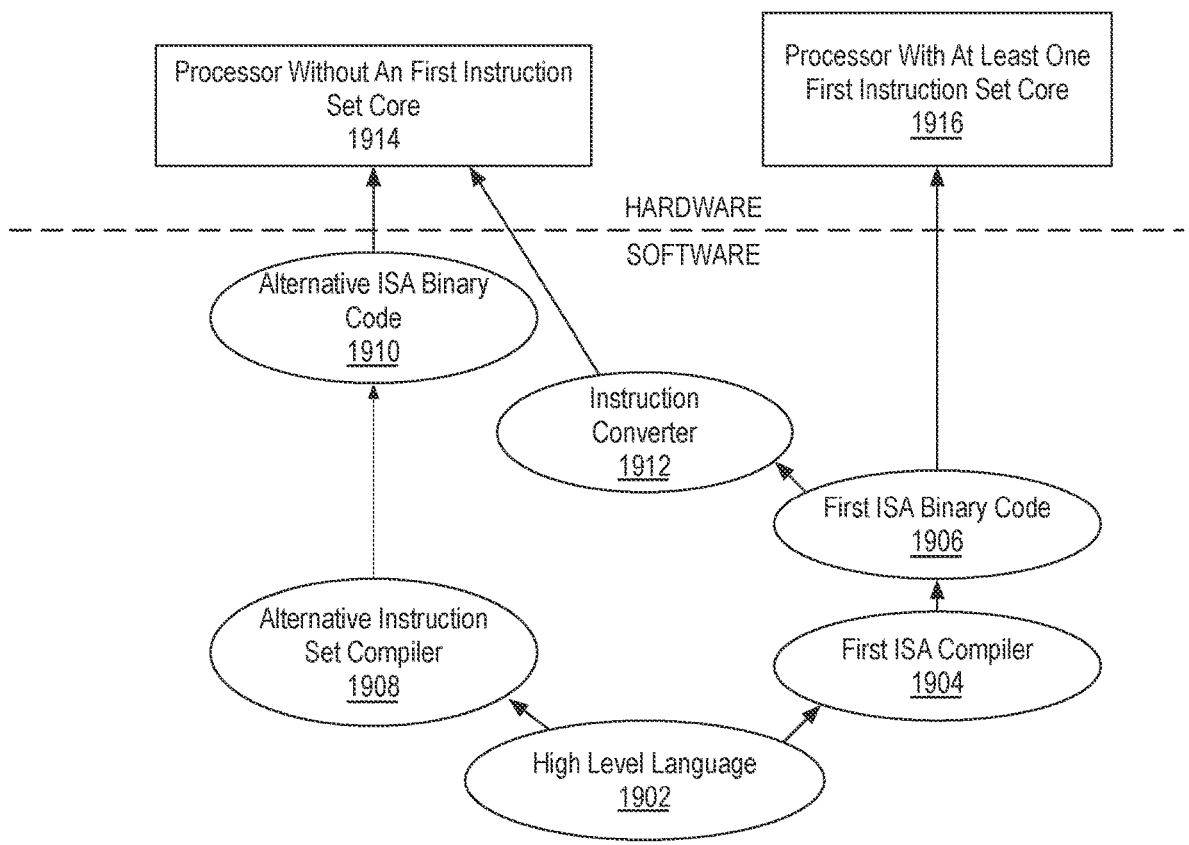
FIG. 19 illustrates a block diagram contrasting the use of a software instruction converter to convert binary instructions in a source instruction set to binary instructions in a target instruction set, according to an embodiment.

FIG. 19 illustrates a block diagram contrasting the use of a software instruction converter to convert binary instructions in a source instruction set to binary instructions in a target instruction set, according to an embodiment. In the illustrated embodiment, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set core 1916. The processor with at least one first ISA instruction set core 1916 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1904 represents a compiler that is operable to generate first ISA binary code 1906 (e.g., object code) that can, with or without additional linkage processing, be executed on the processor with at least one first ISA instruction set core 1916. Similarly, FIG. 19 shows the program in the high-level language 1902 may be compiled using an alternative instruction set compiler 1908 to generate alternative instruction set binary code 1910 that may be natively executed by a processor without a first ISA instruction set core 1914. The instruction converter 1912 is used to convert the first ISA binary code 1906 into code that may be natively executed by the processor without a first ISA instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have a first ISA instruction set processor or core to execute the first ISA binary code 1906.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

FIG. 20A-20D illustrate IP core development and associated package assemblies that can be assembled from diverse IP cores.

Figure 20A:
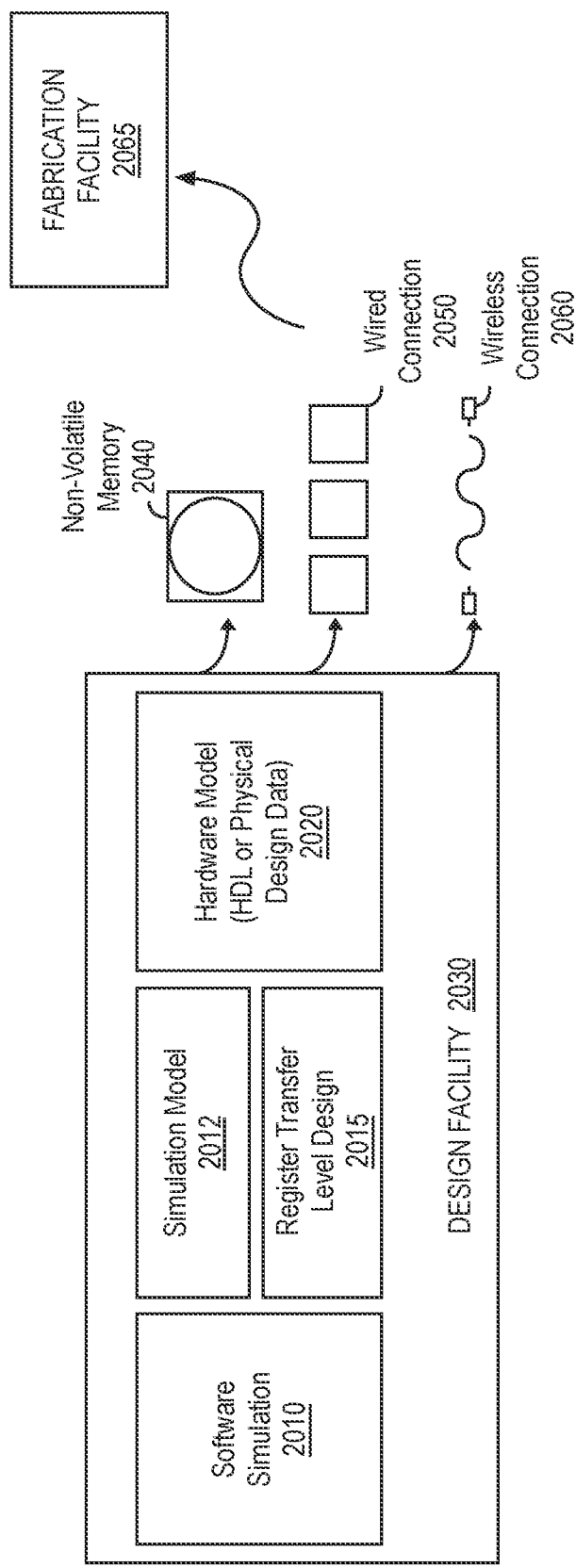
FIG. 20A-20D illustrate IP core development and associated package assemblies that can be assembled from diverse IP cores.

FIG. 20A is a block diagram illustrating an IP core development system 2000 that may be used to manufacture an integrated circuit to perform operations according to an embodiment. The IP core development system 2000 may be used to generate modular, re-usable designs that can be incorporated into a larger design or used to construct an entire integrated circuit (e.g., an SOC integrated circuit). A design facility 2030 can generate a software simulation 2010 of an IP core design in a high-level programming language (e.g., C/C++). The software simulation 2010 can be used to design, test, and verify the behavior of the IP core using a simulation model 2012. The simulation model 2012 may include functional, behavioral, and/or timing simulations. A register transfer level (RTL) design 2015 can then be created or synthesized from the simulation model 2012. The RTL design 2015 is an abstraction of the behavior of the integrated circuit that models the flow of digital signals between hardware registers, including the associated logic performed using the modeled digital signals. In addition to an RTL design 2015, lower-level designs at the logic level or transistor level may also be created, designed, or synthesized. Thus, the particular details of the initial design and simulation may vary.

The RTL design 2015 or equivalent may be further synthesized by the design facility into a hardware model 2020, which may be in a hardware description language (HDL), or some other representation of physical design data. The HDL may be further simulated or tested to verify the IP core design. The IP core design can be stored for delivery to a $3^{rd}$ party fabrication facility 2065 using non-volatile memory 2040 (e.g., hard disk, flash memory, or any non-volatile storage medium). Alternatively, the IP core design may be transmitted (e.g., via the Internet) over a wired connection 2050 or wireless connection 2060. The fabrication facility 2065 may then fabricate an integrated circuit that is based at least in part on the IP core design. The fabricated integrated circuit can be configured to perform operations in accordance with at least one embodiment described herein.

Figure 20B:
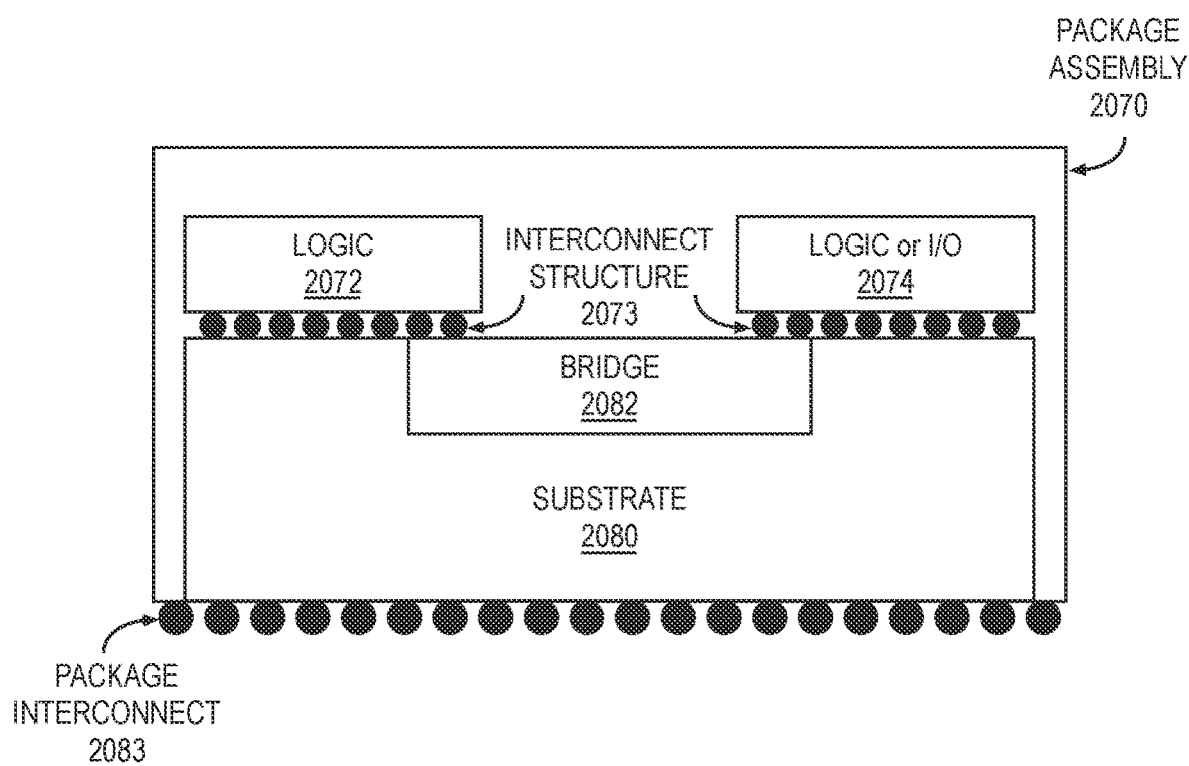

FIG. 20B illustrates a cross-section side view of an integrated circuit package assembly 2070, according to some embodiments described herein. The integrated circuit package assembly 2070 illustrates an implementation of one or more processor or accelerator devices as described herein. The package assembly 2070 includes multiple units of hardware logic 2072, 2074 connected to a substrate 2080. The logic 2072, 2074 may be implemented at least partly in configurable logic or fixed-functionality logic hardware and can include one or more portions of any of the processor core(s), graphics processor(s), or other accelerator devices described herein. Each unit of logic 2072, 2074 can be implemented within a semiconductor die and coupled with the substrate 2080 via an interconnect structure 2073. The interconnect structure 2073 may be configured to route electrical signals between the logic 2072, 2074 and the substrate 2080, and can include interconnects such as, but not limited to bumps or pillars. In some embodiments, the interconnect structure 2073 may be configured to route electrical signals such as, for example, input/output (I/O) signals and/or power or ground signals associated with the operation of the logic 2072, 2074. In some embodiments, the substrate 2080 is an epoxy-based laminate substrate. The substrate 2080 may include other suitable types of substrates in other embodiments. The package assembly 2070 can be connected to other electrical devices via a package interconnect 2083. The package interconnect 2083 may be coupled to a surface of the substrate 2080 to route electrical signals to other electrical devices, such as a motherboard, other chipset, or multi-chip module.

In some embodiments, the units of logic 2072, 2074 are electrically coupled with a bridge 2082 that is configured to route electrical signals between the logic 2072, 2074. The bridge 2082 may be a dense interconnect structure that provides a route for electrical signals. The bridge 2082 may include a bridge substrate composed of glass or a suitable semiconductor material. Electrical routing features can be formed on the bridge substrate to provide a chip-to-chip connection between the logic 2072, 2074.

Although two units of logic 2072, 2074 and a bridge 2082 are illustrated, embodiments described herein may include more or fewer logic units on one or more dies. The one or more dies may be connected by zero or more bridges, as the bridge 2082 may be excluded when the logic is included on a single die. Alternatively, multiple dies or units of logic can be connected by one or more bridges. Additionally, multiple logic units, dies, and bridges can be connected in other possible configurations, including three-dimensional configurations.

Figure 20C:
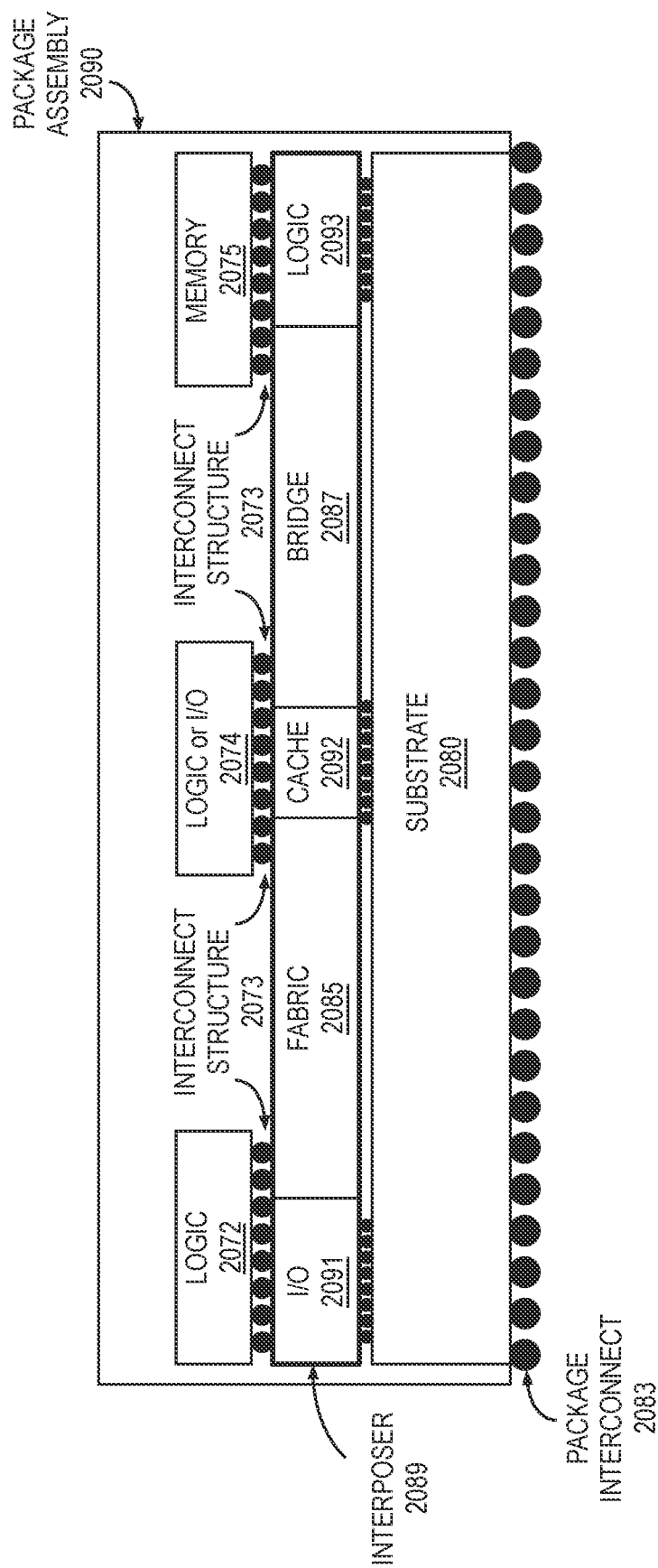

FIG. 20C illustrates a package assembly 2090 that includes multiple units of hardware logic chiplets connected to a substrate 2080. A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated TPs are more amenable to being power gated independently, components that are not in use on a given workload can be powered off, reducing overall power consumption.

In various embodiments a package assembly 2090 can include components and chiplets that are interconnected by a fabric 2085 and/or one or more bridges 2087. The chiplets within the package assembly 2090 may have a 2.5D arrangement using Chip-on-Wafer-on-Substrate stacking in which multiple dies are stacked side-by-side on a silicon interposer 2089 that couples the chiplets with the substrate 2080. The substrate 2080 includes electrical connections to the package interconnect 2083. In one embodiment the silicon interposer 2089 is a passive interposer that includes through-silicon vias (TSVs) to electrically couple chiplets within the package assembly 2090 to the substrate 2080. In one embodiment, silicon interposer 2089 is an active interposer that includes embedded logic in addition to TSVs. In such embodiment, the chiplets within the package assembly 2090 are arranged using 3D face to face die stacking on top of the silicon interposer 2089. The silicon interposer 2089, when an active interposer, can include hardware logic for I/O 2091, cache memory 2092, and other hardware logic 2093, in addition to interconnect fabric 2085 and a silicon bridge 2087. The fabric 2085 enables communication between the various logic chiplets 2072, 2074 and the logic 2091, 2093 within the silicon interposer 2089. The fabric 2085 may be an NoC (Network on Chip) interconnect or another form of packet switched fabric that switches data packets between components of the package assembly. For complex assemblies, the fabric 2085 may be a dedicated chiplet enables communication between the various hardware logic of the package assembly 2090.

Bridge structures 2087 within the silicon interposer 2089 may be used to facilitate a point-to-point interconnect between, for example, logic or I/O chiplets 2074 and memory chiplets 2075. In some implementations, bridge structures 2087 may also be embedded within the substrate 2080. The hardware logic chiplets can include special purpose hardware logic chiplets 2072, logic or I/O chiplets 2074, and/or memory chiplets 2075. The hardware logic chiplets 2072 and logic or I/O chiplets 2074 may be implemented at least partly in configurable logic or fixed-functionality logic hardware and can include one or more portions of any of the processor core(s), graphics processor(s), parallel processors, or other accelerator devices described herein. The memory chiplets 2075 can be DRAM (e.g., GDDR, HBM) memory or cache (SRAM) memory. Cache memory 2092 within the silicon interposer 2089 (or substrate 2080) can act as a global cache for the package assembly 2090, part of a distributed global cache, or as a dedicated cache for the fabric 2085.

Each chiplet can be fabricated as separate semiconductor die and coupled with a base die that is embedded within or coupled with the substrate 2080. The coupling with the substrate 2080 can be performed via an interconnect structure 2073. The interconnect structure 2073 may be configured to route electrical signals between the various chiplets and logic within the substrate 2080. The interconnect structure 2073 can include interconnects such as, but not limited to bumps or pillars. In some embodiments, the interconnect structure 2073 may be configured to route electrical signals such as, for example, input/output (I/O) signals and/or power or ground signals associated with the operation of the logic, I/O and memory chiplets. In one embodiment, an additional interconnect structure couples the silicon interposer 2089 with the substrate 2080.

In some embodiments, the substrate 2080 is an epoxy-based laminate substrate. The substrate 2080 may include other suitable types of substrates in other embodiments. The package assembly 2090 can be connected to other electrical devices via a package interconnect 2083. The package interconnect 2083 may be coupled to a surface of the substrate 2080 to route electrical signals to other electrical devices, such as a motherboard, other chipset, or multi-chip module.

In some embodiments, a logic or I/O chiplet 2074 and a memory chiplet 2075 can be electrically coupled via a bridge 2087 that is configured to route electrical signals between the logic or I/O chiplet 2074 and a memory chiplet 2075. The bridge 2087 may be a dense interconnect structure that provides a route for electrical signals. The bridge 2087 may include a bridge substrate composed of glass or a suitable semiconductor material. Electrical routing features can be formed on the bridge substrate to provide a chip-to-chip connection between the logic or I/O chiplet 2074 and a memory chiplet 2075. The bridge 2087 may also be referred to as a silicon bridge or an interconnect bridge. For example, the bridge 2087, in some embodiments, is an Embedded Multi-die Interconnect Bridge (EMIB). In some embodiments, the bridge 2087 may simply be a direct connection from one chiplet to another chiplet.

Figure 20D:
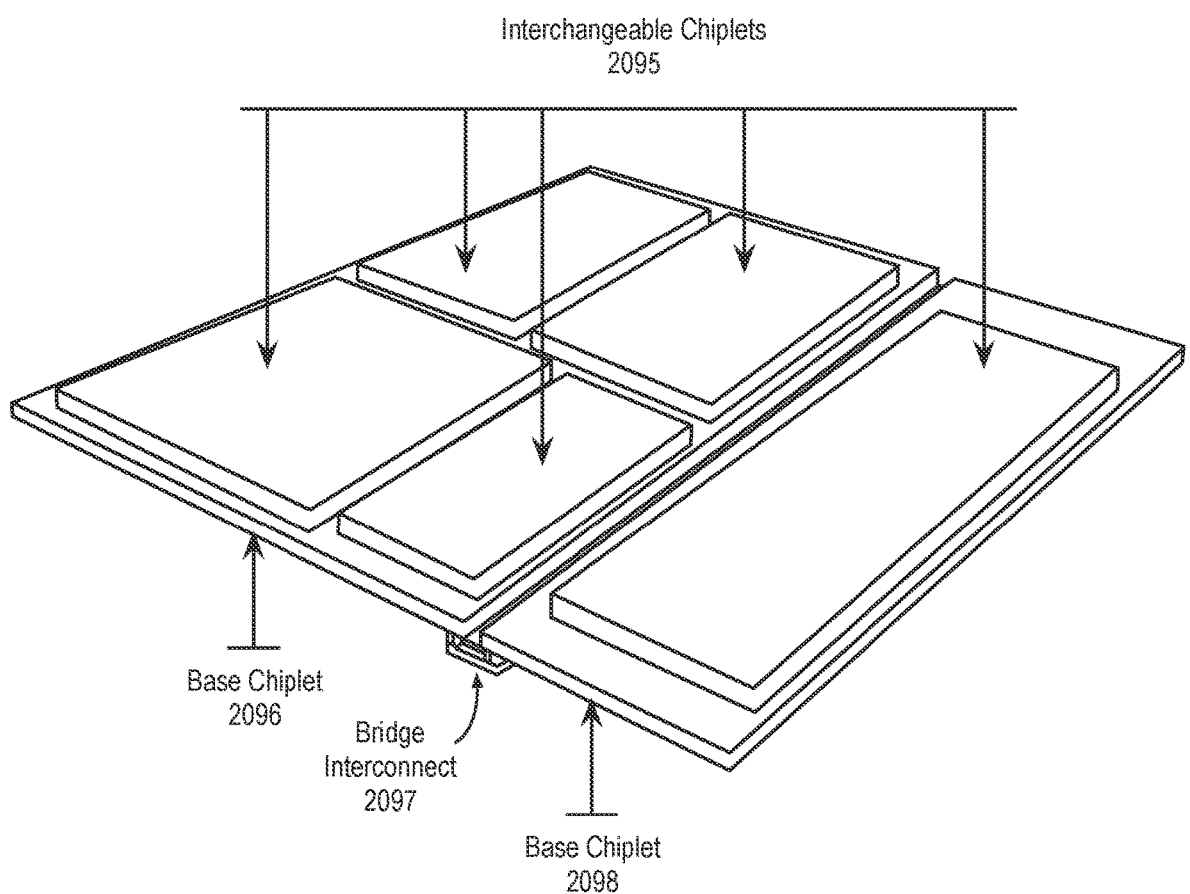

FIG. 20D illustrates a package assembly 2094 including interchangeable chiplets 2095, according to an embodiment. The interchangeable chiplets 2095 can be assembled into standardized slots on one or more base chiplets 2096, 2098. The base chiplets 2096, 2098 can be coupled via a bridge interconnect 2097, which can be similar to the other bridge interconnects described herein and may be, for example, an EMIB. Memory chiplets can also be connected to logic or I/O chiplets via a bridge interconnect I/O and logic chiplets can communicate via, an interconnect fabric. The base chiplets can each support one or more slots in a standardized format for one of logic or I/O or memory/cache.

In one embodiment, SRAM and power delivery circuits can be fabricated into one or more of the base chiplets 2096, 2098, which can be fabricated using a different process technology relative to the interchangeable chiplets 2095 that are stacked on top of the base chiplets. For example, the base chiplets 2096, 2098 can be fabricated using a larger process technology, while the interchangeable chiplets can be manufactured using a smaller process technology. One or more of the interchangeable chiplets 2095 may be memory (e.g., DRAM) chiplets. Different memory densities can be selected for the package assembly 2094 based on the power, and/or performance targeted for the product that uses the package assembly 2094. Additionally, logic chiplets with a different number of type of functional units can be selected at time of assembly based on the power, and/or performance targeted for the product, Additionally, chiplets containing IP logic cores of differing types can be inserted into the interchangeable chiplet slots, enabling hybrid processor designs that can mix and match different technology IP blocks.

Figure 21:
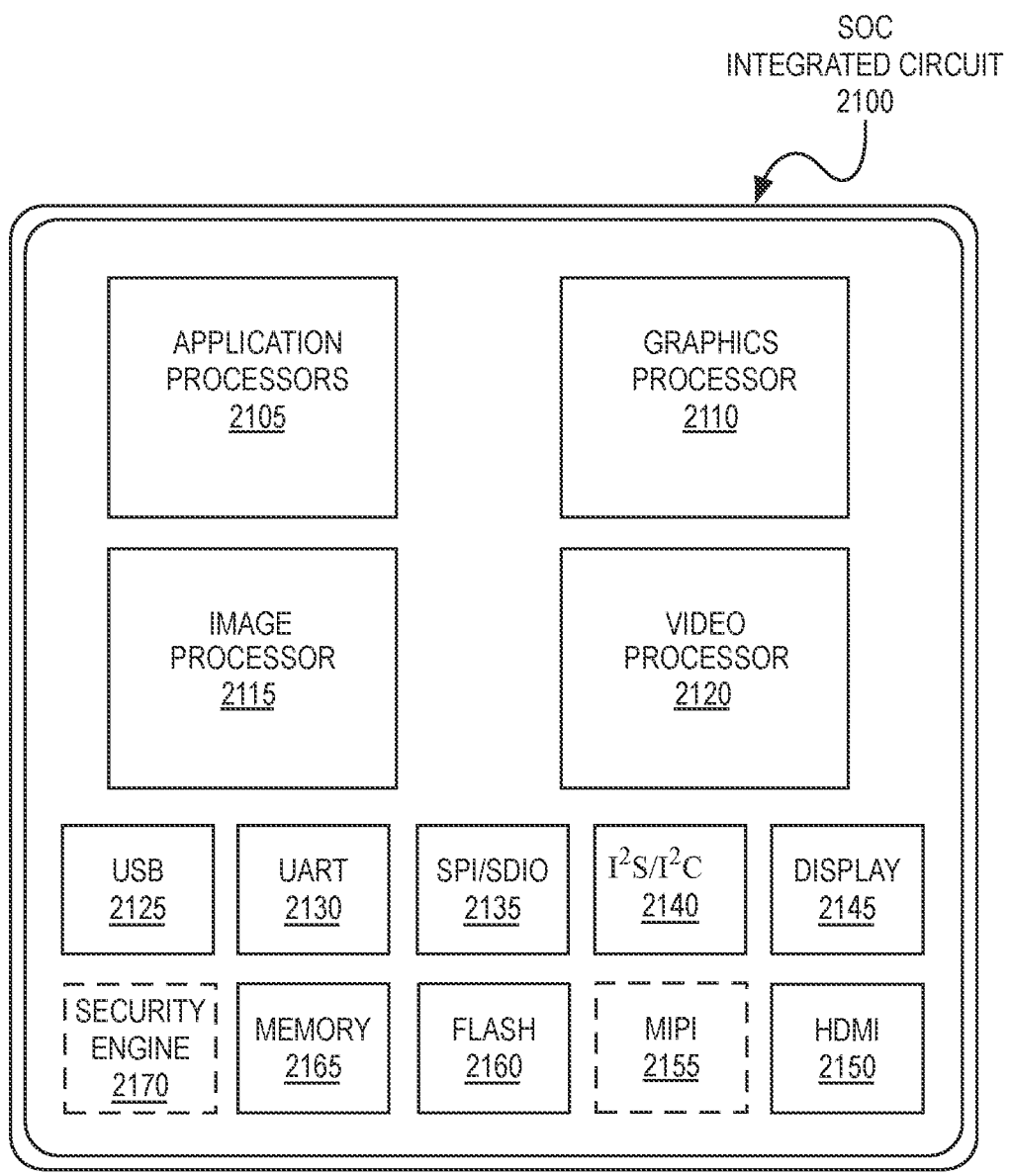
FIG. 21 illustrates an exemplary integrated circuit and associated processors that may be fabricated using one or more IP cores, according to various embodiments described herein.

FIG. 21 illustrates an exemplary integrated circuit and associated processors that may be fabricated using one or more IP cores, according to various embodiments described herein. In addition to what is illustrated, other logic and circuits may be included, including additional graphics processors/cores, peripheral interface controllers, or general-purpose processor cores. As shown in FIG. 21, an integrated circuit 2100 can include one or more application processors 2105 (e.g., CPUs), at least one graphics processor 2110, and may additionally include an image processor 2115 and/or a video processor 2120, any of which may be a modular IP core from the same or multiple different design facilities. Integrated circuit 2100 includes peripheral or bus logic including a USB controller 2125, UART controller 2130, an SPI/SDIO controller 2135, and an I²S/I²C controller 2140. Additionally, the integrated circuit can include a display device 2145 coupled to one or more of a high-definition multimedia interface (HDMI) controller 2150 and a mobile industry processor interface (MIPI) display interface 2155. Storage may be provided by a flash memory subsystem 2160 including flash memory and a flash memory controller. Memory interface may be provided via a memory controller 2165 for access to SDRAM or SRAM memory devices. Some integrated circuits additionally include an embedded security engine 2170.

References herein to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

In the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. Those skilled in the art will appreciate that the broad techniques of the embodiments described herein can be implemented in a variety of forms. Therefore, while the embodiments have been described in connection with examples thereof, the true scope of the embodiments should not be so limited since other modifications will become apparent to the skilled practitioner upon a study of the drawings, specification, and following claims.

What is claimed is:

1. A processor comprising:
   first circuitry to decode an instruction, the instruction to indicate a first source packed data operand and a second source packed data operand, the first source packed data operand to have a first plurality of integer data elements and the second source packed data operand to have a second plurality of integer data elements; and
   second circuitry including a processing resource to perform operations corresponding to the instruction, including to:
   determine whether each integer data element of the first plurality of integer data elements of the first source packed data operand is greater than or equal to a corresponding integer data element of the second plurality of integer data elements of the second source packed data operand;
   for each integer data element of the first plurality of integer data elements that is greater than or equal to the corresponding integer data element of the second plurality of integer data elements, output a corresponding result data element in a result packed data that is equal to the integer data element of the first plurality of integer data elements minus the corresponding integer data element of the second plurality of integer data elements; and
   for each integer data element of the first plurality of integer data elements that is not greater than or equal to the corresponding integer data element of the second plurality of integer data elements, output the corresponding integer data element of the first plurality of integer data elements as a corresponding result data element in the result packed data.

2. The processor as in claim 1, wherein the first plurality of integer data elements and the second plurality of integer data elements are 32-bit integer data elements.

3. The processor as in claim 1, wherein the first plurality of integer data elements and the second plurality of integer data elements are 64-bit integer data elements.

4. The processor as in claim 1, wherein the instruction is to indicate a destination operand to specify a destination and the processing resource is to store the result packed data to the destination.

5. The processor as in claim 4, further comprising a register file having a plurality of registers of differing widths, wherein the destination operand is to specify a first register within the register file and the first source packed data operand or the second source packed data operand are to be stored in a second register within the register file.

6. The processor as in claim 5, wherein the destination operand is to specify a 128-bit register, a 256-bit register, or a 512-bit register.

7. An apparatus comprising:
   decoder circuitry to decode an instruction, the instruction to include a field for an identifier of a first source packed data operand having a first plurality of integer data elements, a field for an identifier of a second source packed data operand having a second plurality of integer data elements, and a field for an opcode, the opcode to indicate execution circuitry is to perform a conditional subtraction operations on the first source packed data operand and the second source packed data operand; and
   the execution circuitry to perform the conditional subtraction operations according to the opcode, including to perform the conditional subtraction operations in parallel on each integer data element of the first plurality of integer data elements and corresponding integer data elements of the second plurality of integer data elements, the execution circuitry including:
   a first circuit to generate subtraction results based on integer data element of the first plurality of integer data elements minus corresponding integer data elements of the second plurality of integer data elements and status flags to indicate signs of the subtraction results; and
   a second circuit to output the integer data elements of the first plurality of integer data elements when the status flags indicate that the subtraction results are negative and otherwise to output the subtraction results.

8. The apparatus as in claim 7, wherein the field for the identifier of the first source packed data operand or the second source operand is to identify a vector register.

9. The apparatus as in claim 7, wherein the field for the identifier of the first source packed data operand is to identify a memory location.

10. The apparatus as in claim 7, wherein the integer data elements of the first source packed data operand and the integer data elements of the second source packed data operand are 32-bit integer data elements.

11. The apparatus as in claim 7, wherein the integer data elements of the first source packed data operand and the integer data elements of the second source packed data operand are 64-bit integer data elements.

12. The apparatus as in claim 7, wherein the instruction is to indicate a destination to store the output integer data elements and the output subtraction results and destination includes a 128-bit, 256-bit, or 512-bit register.

13. A processor comprising:
   first circuitry to decode an instruction, the instruction to indicate a first source packed data operand and a second source operand, the first source packed data operand to have a first plurality of integer data elements and the second source operand to have an integer data element; and second circuitry including a processing resource to perform operations corresponding to the instruction, including to:
- determine whether each integer data element of the first plurality of integer data elements is greater than or equal to the integer data element of the second source operand;
- for each integer data element of the first plurality of integer data elements that is greater than or equal to the integer data element of the second source operand, output a corresponding result data element in a result packed data that is equal to the integer data element of the first plurality of integer data elements minus the integer data element of the second source operand; and
- for each integer data element of the first plurality of integer data elements that is not greater than or equal to the integer data element of the second source operand, output the corresponding integer data element of the first plurality of integer data elements as a corresponding result data element in the result packed data.

14. The processor as in claim 13, wherein the first plurality of integer data elements and the second plurality of integer data elements are either 32-bit integer data elements or 64-bit integer data elements.

15. The processor as in claim 13, further comprising a register file having a plurality of registers of differing widths, wherein the destination operand is to specify a first register within the register file and the first source packed data operand or the second source packed data operand are to be stored in a second register within the register file.

* * * * *